United States Patent [19]

Morganstein et al.

[11] Patent Number: 5,901,203
[45] Date of Patent: May 4, 1999

[54] COMPUTER-BASED SYSTEM AND METHOD FOR IDENTIFYING AN UNIDENTIFIED CALLER

[75] Inventors: Sanford J. Morganstein, West Dundee; Sergey Zaks, Chicago, both of Ill.

[73] Assignee: Distributed Software Development, Inc., Chicago, Ill.

[21] Appl. No.: 08/819,482

[22] Filed: Mar. 17, 1997

Related U.S. Application Data

[63] Continuation-in-part of application No. 08/672,677, Jun. 28, 1996.

[51] Int. Cl.[6] .................................................. H04M 3/22
[52] U.S. Cl. ...................... 379/88.02; 379/218; 379/265
[58] Field of Search ................................ 379/67, 88, 89, 379/142, 88.01, 88.02, 67.1, 214, 218, 265, 266, 267, 245, 247

[56] References Cited

U.S. PATENT DOCUMENTS

| | | | |
|---|---|---|---|
| 4,053,710 | 10/1977 | Advani et al. | 179/1 SB |
| 4,827,518 | 5/1989 | Feustel et al. | 381/42 |
| 4,961,229 | 10/1990 | Takahashi | 381/42 |
| 4,993,068 | 2/1991 | Piosenka et al. | 380/23 |
| 5,054,083 | 10/1991 | Naik et al. | 381/42 |
| 5,125,022 | 6/1992 | Hunt et al. | 379/88 |
| 5,127,043 | 6/1992 | Hunt et al. | 379/88 |
| 5,228,076 | 7/1993 | Hopner et al. | 379/96 |
| 5,247,497 | 9/1993 | Cohn | 369/26 |
| 5,265,191 | 11/1993 | McNair | 395/2.82 |
| 5,274,695 | 12/1993 | Green | 379/88 |
| 5,297,194 | 3/1994 | Hunt et al. | 379/88 |
| 5,303,299 | 4/1994 | Hunt et al. | 379/88 |
| 5,309,504 | 5/1994 | Morganstein | 379/67 |
| 5,327,486 | 7/1994 | Wolff et al. | 379/211 |
| 5,339,361 | 8/1994 | Schwalm et al. | 380/23 |
| 5,365,574 | 11/1994 | Hunt et al. | 379/88 |
| 5,384,833 | 1/1995 | Cameron | 379/67 |
| 5,414,755 | 5/1995 | Bahler et al. | 379/67 |
| 5,465,290 | 11/1995 | Hampton et al. | 379/67 |

OTHER PUBLICATIONS

Claudia Graziano, "Technology uses "voiceprints"to identify Web surfers," Reuters/Wired, Sep. 14, 1998.

ESCA Workshop on Automatic Speaker Recognition Identification and Verification, Martigny, Switzerland, Apr. 507, 1994.

VoicePass 4000™, New Speaker Verification Evaluation Kit, Linkon Corporation, Copyright, 1996.

T–NETRIX "SpeakEZ VoicePrint" product information, not dated.

"SpeakEZ Voice Print[SM]Speaker Verification Demonstration," T–NETIX, dated Jan. 8, 1997.

T–NETIX company and product information, not dated.

*Primary Examiner*—Fan S. Tsang
*Attorney, Agent, or Firm*—Baker & Botts, L.L.P.

[57] ABSTRACT

A computer-based system (70) for identifying an unidentified caller (14) includes a database (42) that contains utterance data (162) corresponding to a known caller. A processing system (72) coupled to the database (42) receives utterance information corresponding to the unidentified caller (14) and compares the utterance information with the utterance data (162) to identify the unidentified caller (14) as the known caller. In response, the processing system (72) provides a call routing option (84). The call routing option (84) may include an accept option (86), a transfer option (90), or a disconnect option (89), and may be provided to a called party visually using a personal computer (50).

24 Claims, 13 Drawing Sheets

FIG. 3a

| ACCOUNT ID | LAST NAME | GENDER | ADDRESS | RESIDENCE | COMMUNICATIONS | ORGANIZATION | SBU | CLEARANCE | ... |
|---|---|---|---|---|---|---|---|---|---|
| J4N055 | SMITH | M | 21 ELM | DALLAS | (214) 555-8675 | XYZ | 62 | — | |
| T3Q864 | HILL | M | 3 MAPLE | DENVER | (303) 555-2392 | ACME | 13 | — | |
| L2T475 | PARK | F | 54 OAK | MIAMI | PARK@ABC.COM | ABC | 32 | 7 | |
| ... | | | | | | | | | |

FIG. 3b

| ACCOUNT ID | ORDER | DATE | PART | MANUFACTURER | SERIAL | PURCHASE | STATUS | ... |
|---|---|---|---|---|---|---|---|---|
| J4N055 | 3221 | 05/22/96 | 43NN | JONES, INC. | 339VM | $295.00 | C | |
| T3Q864 | 4784 | 05/25/96 | J37S | HARRIS, INC. | 4273X0 | $17.00 | D | |
| T3Q864 | 4785 | 05/25/96 | XY;7P | AONE, INC.; XYZ | —;330TVN | $42.00; $1,312.00 | D | |
| L2T475 | 7263 | 06/01/96 | 3907 | AOK CO. | — | | O | |
| ... | | | | | | | | |

| ACCOUNT ID | UTTERANCE | PARAMETRIC ENCODING | LENGTH | PITCH | NAME | GENDER | ° ° ° |
|---|---|---|---|---|---|---|---|
| J4N055 | * * * * * * | * * * | 0.81 | 5123 | SMITH | M | |
| J4N055 | * * * * * * | * * * | 0.82 | 5062 | SMITH | M | |
| J4N055 | * * * * * * | * * * | 0.78 | 5221 | SMITH | M | |
| T3Q864 | * * * * * * | * * * | 0.65 | 6755 | HILL | M | |
| T3Q864 | * * * * * * | * * * | 0.66 | 6602 | HILL | M | |
| L2T475 | * * * * * * | * * * | 0.32 | 9335 | PARK | F | |
| ° ° ° | | | | | | | |

FIG. 3c

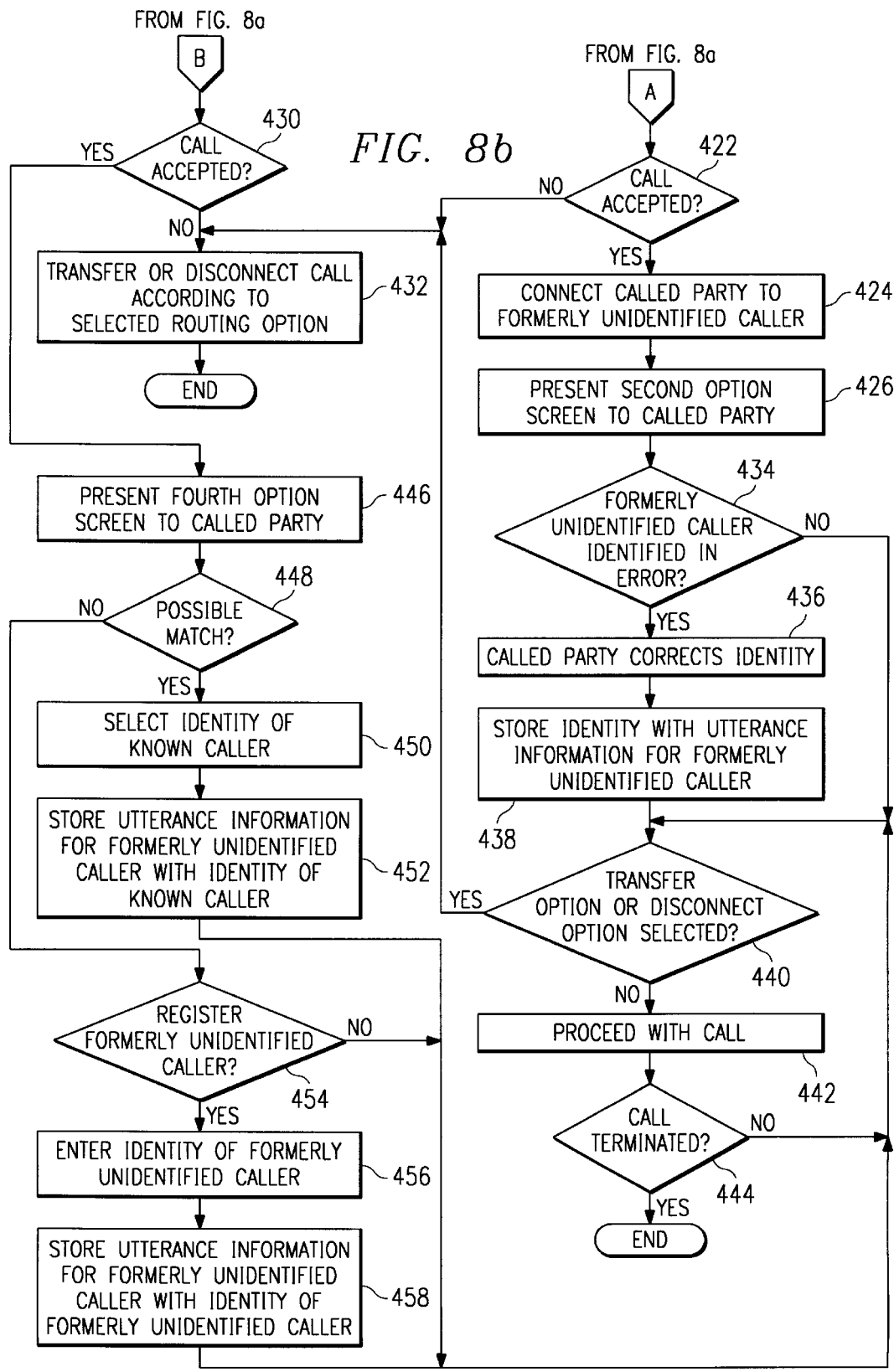

COMPUTER-BASED SYSTEM AND METHOD FOR IDENTIFYING AN UNIDENTIFIED CALLER

CROSS-REFERENCE TO RELATED APPLICATIONS

This application is a continuation in part of U.S. application Ser. No. 08/672,677, filed Jun. 28, 1996, for a "System and Method for Identifying an Unidentified caller."

TECHNICAL FIELD OF THE INVENTION

This invention relates in general to the field of telecommunications, and more particularly to a computer-based system and method for identifying an unidentified caller.

BACKGROUND OF THE INVENTION

Many called parties wish to identify callers before speaking to the callers to allow the called parties to make an informed decision regarding whether to accept the calls or take other appropriate action. For example, a called party within a business or other organizational setting, home setting, or any other suitable setting might elect to accept a call, disconnect a call, or route a call to another suitable person or processing device according to the identity of the caller.

As telecommunications services continue to become more advanced to serve various needs, called parties may desire to identify callers using a variety of techniques. A known technique for identifying a caller includes receiving a telephone number associated with an incoming call and comparing the number with previously stored information to identify the caller associated with the incoming call. Such techniques are unsatisfactory if the caller is calling from a telephone, extension, or location having a telephone number different than the number that corresponds to the stored information. Other techniques may even compare a spoken word or phrase identifying the caller with a stored voice print to verify an identification made through a personal interaction with the caller or through digit or voice recognition of a personal identification number (PIN), account number, or other identifier.

Although these techniques may be acceptable to verify the identity of a caller that has already been identified, these techniques do not identify an unidentified caller out of a universe of known callers. Furthermore, techniques that require a personal interaction with the caller to generate information for comparison with stored information are often relatively inefficient and costly. Requiring the caller to provide a PIN, account number, or other number is similarly cumbersome from the perspective of the caller. Moreover, such techniques do not provide the called party with real-time control over the call prior to accepting the call or provide the called party with information to allow the called party to make an informed decision regarding whether to accept the call, transfer the call, disconnect the call, or route the call in some other manner. These and other problems make previous techniques for identifying callers inadequate for many applications.

SUMMARY OF THE INVENTION

The present invention addresses disadvantages and problems associated with previous systems and methods for identifying callers.

According to one embodiment of the present invention, a computer-based system for identifying an unidentified caller includes a database containing utterance data that corresponds to a known caller. A processing system coupled to the database receives utterance information that corresponds to the unidentified caller and compares the utterance information with the utterance data to identify the unidentified caller as the known caller. In response, the processing system provides a call routing option. In a particular embodiment, the call routing option includes an accept option, a transfer option, or a disconnect option, and is provided to a called party visually using a personal computer.

The present invention provides a computer-based system and method for identifying an unidentified caller that not only verifies the identity of the unidentified caller, but also identifies the unidentified caller from a universe of known callers. The system and method of the present invention identifies the unidentified caller regardless of the location, switching system, trunk line, or telephone number associated with the caller, and may be used in a variety of computer-based contexts, including personal and business home use, business and organizational settings, and any other suitable application. The present invention improves the efficiency of the identification process by reducing personal interaction between callers and called parties or the often cumbersome task of manually or verbally providing an identifying number. Furthermore, the present invention may be self learning, such that the likelihood of identifying a particular unidentified caller may increase each time the caller interacts with the system. Moreover, the computer-based system and method of the present invention provides the called party with real-time control over the call to allow the called party to make an informed routing decision based on the identity of the identified caller. The present invention also allows the called party to pre-program routing options according to the identity of the identified caller.

BRIEF DESCRIPTION OF THE DRAWINGS

For a more complete understanding of the present invention and for further features and advantages thereof, reference is now made to the following description taken in conjunction with the accompanying drawings, in which:

FIGS. 3a through 3c illustrate relationships between account identifiers for known callers and identity data, order data, and utterance data, respectively, for the known callers;

FIGS. 8a and 8b are a flow chart illustrating a method of identifying an unidentified caller.

DETAILED DESCRIPTION OF THE INVENTION

Figure 1:
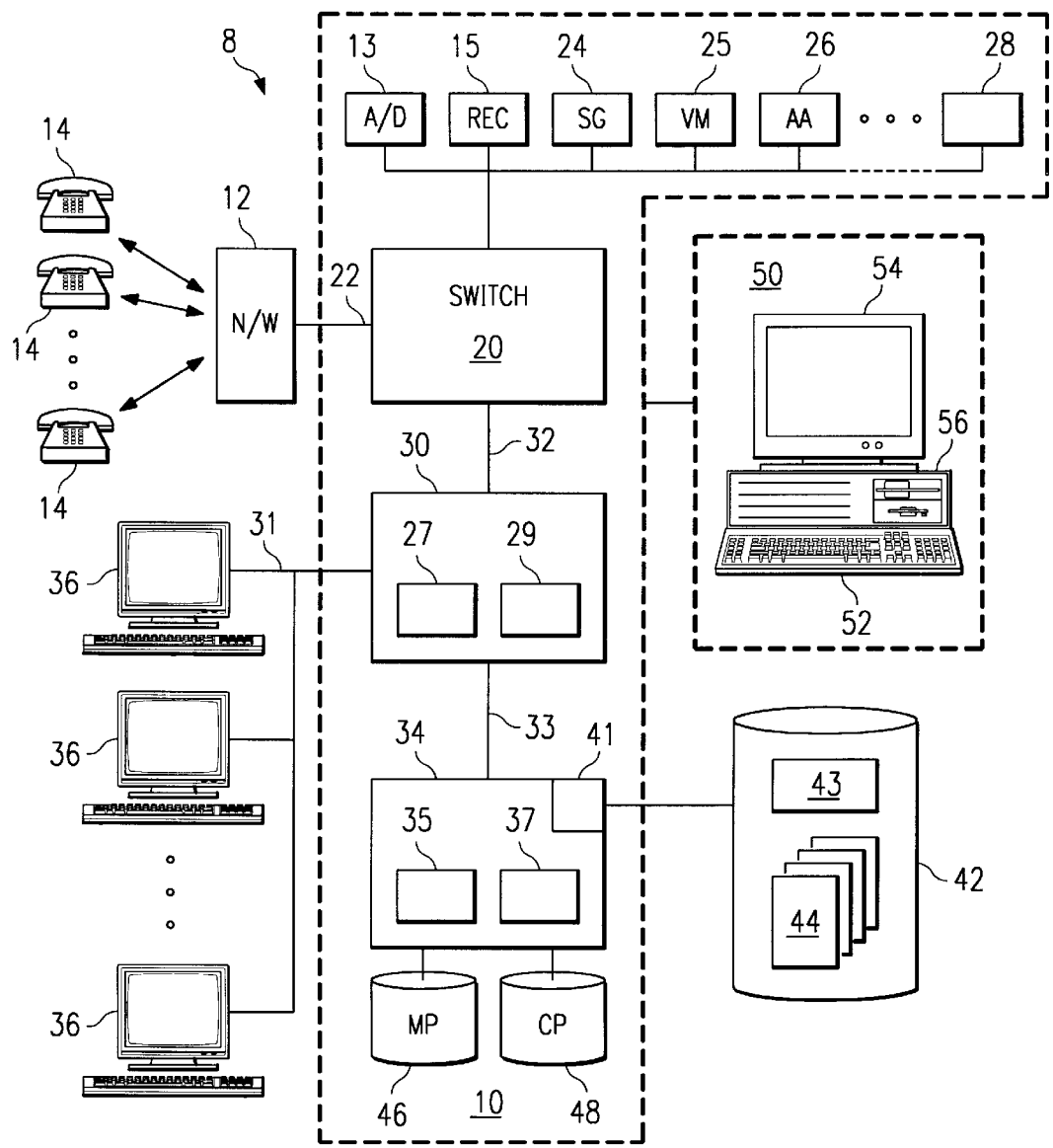
FIG. 1 illustrates a system for identifying an unidentified caller.

FIG. 1 illustrates a system 8 for identifying an unidentified caller that includes a processing system 10, a network (N/W) 12, one or more agents 36, and a database 42. Processing system 10 is coupled to and interacts with network 12. Network 12 may be a public switched telephone network (PSTN) or any other suitable network to receive incoming calls from one or more unidentified callers 14 and transmit the incoming calls to a telephone switching system (SWITCH) 20 using link 22. Network 12 may include one or more local, exchange area, and/or long-haul networks to communicate information in analog, digital, or any other suitable form using any appropriate transmission facility. Link 22 may include one or more subscriber lines or other appropriate wireline or wireless links for connecting unidentified callers 14 to switching system 20 using network 12. Although unidentified callers 14 are discussed in the plural, the present invention contemplates a single or multiple unidentified callers 14.

Switching system 20 may be a private branch exchange (PBX) system; a central exchange (centrex) system; an automatic call distribution (ACD) system; a key telephone system; a telephone that is directly, indirectly, locally, remotely, or otherwise connected to network 12; or any other appropriate telephone switching system. Switching system 20 may include a speech generation capability (SG) 24, a voice messaging (VM) capability 25, an automated attendant (AA) capability 26, and any other suitable voice processing or call processing capabilities 28, in any suitable combination, whether directly integrated into switching system 20 or as adjunct processors operating on one or more computers or other processing devices at one or more locations and appropriately coupled to switching system 20. Switching system 20 also includes analog-to-digital (A/D) conversion and recording (REC) facilities 13 and 15, respectively, which may include suitable hardware and software to digitize and record utterances provided by unidentified callers 14. While not shown, switching system 20 further includes one or more call processors for coordinating the operations of the various components of switching system 20 and one or more buses to allow the components to communicate information.

Switching system 20 is coupled to and interacts with system server 30 using link 32. Link 32 may be any suitable connection through a local area network (LAN), metropolitan area network (MAN), wide area network (WAN), a global computer network such as the Internet, or other appropriate network; a standard data link and protocol connection used to connect an external computer to a telephone switching system, such as a Telephony Services Application Programming Interface (TSAPI); a service provider's proprietary interface; an integrated services digital network (ISDN) link; an internal bus; or any other appropriate connection. The present invention contemplates system server 30 being integral to or separate from switching system 20.

System server 30 is a mainframe computer or other processing device that manages communications between switching system 20, agents 36, and database server 34 using links 32, 31, and 33, as the case may be. System server 30 may also manage communications between data communications system 10 and a network or other resource external to network 12, agents 36, and processing system 10. System server 30 includes a memory 27 and a processor 29 that together operate to store, process, or manipulate data. Memory 27 may be any suitable memory, such as dynamic or static random access memory (RAM), read only memory (ROM), magnetic media, optical media, CD-ROM, or other suitable volatile or non-volatile storage media. Memory 27 may store information in files, directories, tables, or in any other suitable arrangement. Memory 27 may contain instructions for processor 29 to execute in managing the operations of system server 30. The present invention contemplates multiple system servers 30 operating in parallel to increase the speed or otherwise improve the performance of processing system 10 in identifying one or more unidentified callers 14.

Agents 36 may be autonomous or operated by one or more employees, representatives, operators, or other persons, possibly associated with an organization, that may interact in some manner with unidentified callers 14. Link 31 may be a connection through a LAN, MAN, WAN, a global computer network such as the Internet, or any other suitable communications connection. Agents 36 may be any logical entities in hardware and/or software, such as minicomputers or personal computers, that send and receive information using link 31 and system server 30. In one embodiment, a particular agent 36 interacts with unidentified caller 14 once unidentified caller 14 has been identified using processing system 10. Although agents 36 are discussed, the present invention contemplates more or fewer agents 36 depending on the organization and the incoming call traffic generated by unidentified callers 14.

Database server 34 is coupled to and interacts with database 42 and an associated database management system (DBMS) 43. In one embodiment, database 42 is a relational database that stores information in tables containing rows and columns of data. The rows of a table represent records, which are collections of information about separate items, and the columns represent fields, which are particular attributes of the records. In conducting searches, database 42 matches information from a field in a first table with information in the corresponding field of a second table to produce a third table that combines requested data from the first and second tables. In general, database 42 uses matching values in two tables to relate information in one table to information in the other table. Database 42 may store and retrieve data in any suitable manner, and may include one or more databases, files, or other data repositories at a single or multiple locations internal to or external to data communications system 10. Database 42 may be more or less permanent or may be a temporary database, file, or other data repository created by extracting information from more permanent databases, files, or other data repositories for use in identifying unidentified callers 14.

Database 42 contains one or more records 44 that each represent the association of an account or other identifier corresponding to a caller whose identity is known to the organization with account data, order data, identity data, utterance data, or other suitable information concerning the known caller. In one embodiment, the utterance data for each known caller includes one or more utterance identifiers that are digitized representations of one or more spoken utterances of the particular known caller, which may include any suitable sound, word, or phrase. The utterances provided by the known callers are digitized and recorded using the facilities 13 and 15, respectively, associated with switching system 20. The present invention contemplates multiple utterance identifiers for each known caller, whether stored in a single or multiple records 44 and in a single or multiple tables within database 42. The association of account identifiers with identity data, order data, and utterance data for each known caller in records 44 is discussed more fully below in connection with FIGS. 3a through 3c.

Database server 34 may be a mainframe computer, a minicomputer, microprocessor having memory, or personal computer connected to a LAN, or any other processing device that manages communications between system server 30 and database 42. Although database server 34 is shown as separate from system server 30, database server 34 may be integral to or separate from system server 30. Database server 34 supports a DBMS 43 that permits centralized control of security and data integrity requirements for database 42.

In general, DBMS 43 is a layer of software between database 42 and database server 34 that manages access by data communications system 10 to the resources of database 42. Where database 42 is a relational database, the DBMS 43 supported by database server 34 may be a relational DBMS (RDBMS). DBMS 43 and database 42 may execute queries, conduct searches, or perform other activities in response to direct or indirect communications from database server 34 in any suitable form. In one embodiment, database server 34 may provide a key or other suitable identifier to DBMS 43 for DBMS 43 to use in finding, identifying, or otherwise locating one or more records or groups of records within database 42 according to one or more key tables, index files, or other suitable arrangement.

Database server 34 includes a memory 35 and a processor 37 that together operate to store, process, or manipulate data. Memory 35 may be any suitable memory, such as dynamic or static random access memory (RAM), read only memory (ROM), magnetic media, optical media, CD-ROM, or other suitable volatile or non-volatile storage media. Memory 35 may store information in files, directories, tables, or in any other suitable arrangement. Memory 35 may contain instructions for processor 37 to execute in managing the operations of database server 34 and the DBMS 43 supported by database server 34.

Database server 34 accesses one or more match parameters 46 to determine whether a digitized utterance for an unidentified caller 14 is sufficiently correlated with an utterance identifier corresponding to a particular known caller to identify the unidentified caller 14 as the known caller. Match parameters 46 may include, without limitation: an error or discrimination threshold suitable for comparison with an error value derived, calculated, or otherwise determined according to the comparison of the digitized utterance with the utterance identifier, for example, in the manner disclosed in U.S. Pat. No. 4,053,710, which is incorporated by reference herein; a merit parameter for associating a figure of merit, determined according to some suitable scale and in some suitable manner, with the identification of an unidentified caller 14 as a particular known caller; or any other information suitable for determining the sufficiency of the correlation, if any, between utterances for unidentified callers 14 and utterance identifiers for known callers in database 42. Database server 34 may communicate one or more match parameters 46 to DBMS 43 in association with a key or other suitable identifier to facilitate the location and retrieval of one or more utterance identifiers or other information from database 42.

Database server 34 communicates with database 42 using interface 41. Interface 41 may be any mechanism suitable to allow database server 34 and database 42 to communicate with one another. For example, interface 41 may include the appropriate hardware and software to communicate using a direct connection to a PSTN, a direct connection using a bus or wireline link, a connection through a LAN, MAN, WAN, a global network such as the Internet, or other network, or any other communications connection suitable to access one or more databases or files at one or more locations. Interface 41 may include protocol conversion and some data processing capabilities suitable to allow interface 41 to facilitate data communications between database server 34 and database 42.

Database server 34 and interface 41 may access one or more communication parameters 48 to communicate with database 42. Communications parameters 48 maintain access information for each database, file, directory, or other data repository associated with database 42 that may include, without limitation: a username; a password; a telephone number; communication port settings; database specifications; library and file names; directory paths; library and file paths; protocol information; and any other information suitable for communicating information to and receiving information from database 42.

Data communications system 10 may operate on one or more computers 50 that are integral to or separate from the hardware and software that support network 12, agents 36, system server 30, database server 34, and database 42. Computer 50 may include an input device 52, such as a keypad, touch screen, microphone, or other device that can accept suitable information. An output device 54 may convey information associated with the operation of data communications system 10, including digital or analog data, visual information, or audio information. Both input device 52 and output 54 may include fixed or removable storage media, such as magnetic computer disk, CD-ROM, or other suitable media to both receive output from and provide input to data communications system 10. Computer 50 may have a processor 56 and an associated volatile or non-volatile memory to execute instructions and manipulate information in accordance with the operation of data communications system 10.

In operation with respect to agents 36, an unidentified caller 14 places a call to the organization using network 12 and link 22. Switching system 20 receives the incoming call and prompts unidentified caller 14 to provide an utterance, such as the spoken name of unidentified caller 14, using the associated speech generation capability 24, by playing a prerecorded message, or in any other suitable manner. When unidentified caller 14 responds by providing an utterance, switching system 20 receives, digitizes, and records the utterance using facilities 13 and 15, respectively. Switching system 20 communicates the digitized utterance to system server 30 and queues the incoming call until an appropriate agent 36 becomes available. When an appropriate agent 36 becomes available, switching system 20 transfers the call to the appropriate agent 36 and provides the identity of the selected agent 36 to system server 30.

In parallel with the queuing and transfer of the incoming call, system server 30 communicates the digitized utterance to database server 34, which together with associated DBMS 43 searches records 44 contained in database 42 to compare the digitized utterance with the stored utterance identifiers corresponding to one or more known callers. If the digitized utterance suitably duplicates, resembles, matches, or is otherwise correlated with a stored utterance identifier according to one or more match parameters 46, unidentified caller 14 is identified as the known caller corresponding to the particular stored utterance identifier. Database server 34 retrieves account data, order data, identity data, or other suitable information for the known caller from database 42 and communicates this information to the selected agent 36 in some suitable manner using system server 30 and link 31.

Data communications system 10 may coordinate and synchronize the identification of and transfer of the call to selected agent 36; the identification of unidentified caller 14 as a particular known caller; the retrieval of information corresponding to the known caller from database 42; and the communication, delivery, or presentation of the information to selected agent 36 using any appropriate technique, whether or not switching system 20 and system server 30 are integrated with one another. After the selected agent 36 receives the retrieved information for the formerly unidentified caller 14, the selected agent may interact with the caller to handle the incoming call in some suitable manner according to the needs of the caller or the organization. The present invention contemplates identifying one or more unidentified callers 14 using system 8 in any suitable business, organizational, or other context or application.

Figure 2:
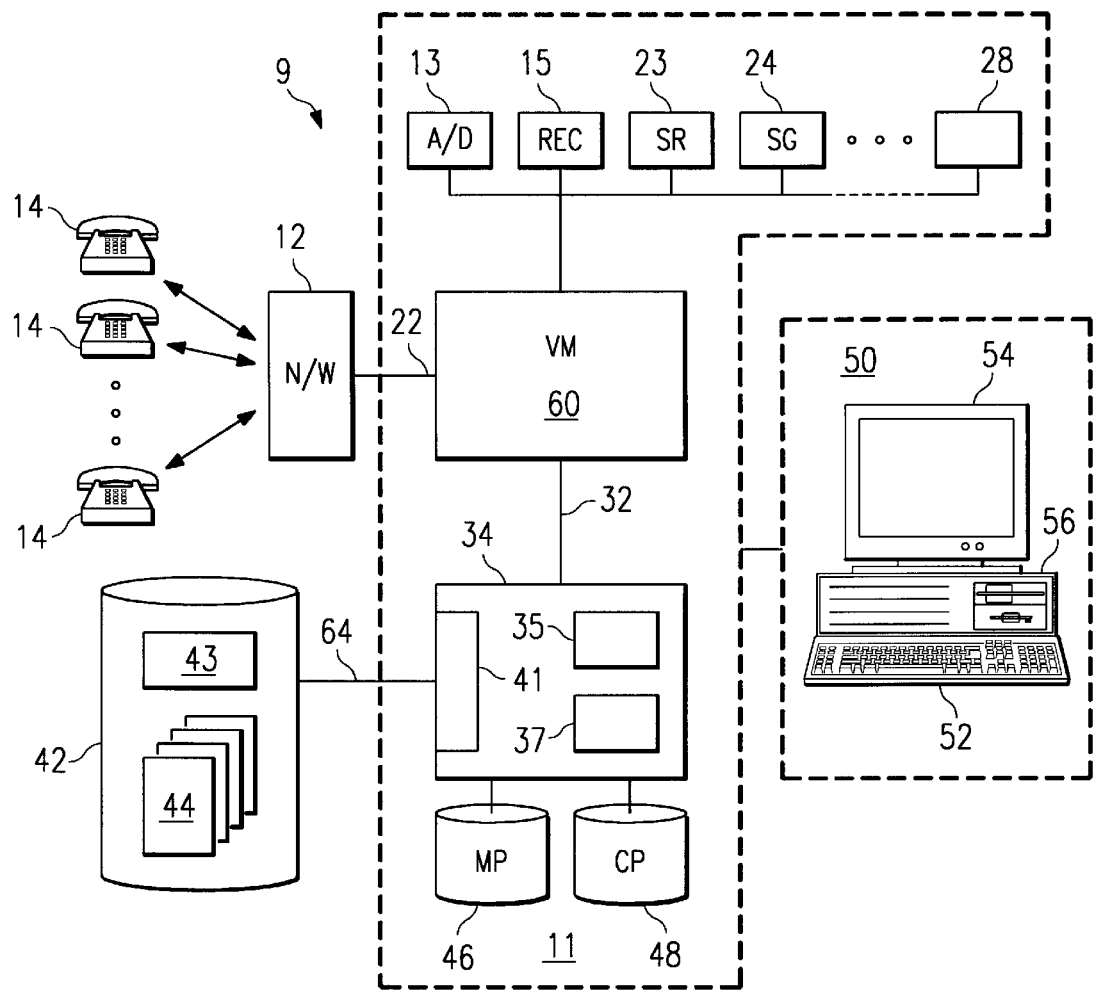
FIG. 2 illustrates a system for identifying an unidentified caller in a voice messaging environment.

FIG. 2 illustrates a system 8 for identifying an unidentified caller 14 in a voice messaging environment that includes a data communications system 11, a network 12, and a database 42. The components and operation of system 9 that includes data communications system 11 are similar to those discussed above with reference to FIG. 1 and system 8 that includes data communications system 10. System 9 may or may not include switching system 20, automated attendant capability 26, system server 30, or agents 36. The present invention contemplates system 9 that includes data communications system 11 replacing or combining with system 8 that includes data communications system 10 in some manner. Similar to data communications system 10 discussed above, data communications system 11 may operate on one or more computers 50 that are integral to or separate from the hardware and software that support network 12, database server 34, and database 42.

Voice messaging system 60 may be any voice mail or other system for receiving, recording, and storing messages from one or more unidentified callers 14 within or outside the organization. Voice messaging system 60 may be the same as, may replace, or may combine with voice messaging capability 25 of data communications system 10 in some suitable manner. Voice messaging system 60 may be integral to or separate from a telephone switching system, such as switching system 20 discussed above in connection with FIG. 1, and may receive incoming calls directly or through such a telephone switching system. Voice messaging system 60 may include analog-to-digital conversion facility 13, recording facility 15, a speech recognition capability (SR) 23, speech generation capability 24, or any other suitable voice processing or call processing capabilities 28, in any combination, whether directly integrated into voice messaging system 60 or as adjunct processors operating on one or more computers or other processing devices at one or more locations and suitably coupled to voice messaging system 60.

In operation, an unidentified caller 14 places a call to the organization using network 12 and link 22. Voice messaging system 60 receives the incoming call and, if voice messaging system 60 is not connected to a telephone system in such a way as to determine the identity of unidentified caller 14 according to the location, switching system, trunk line, or telephone number associated with unidentified caller 14, prompts unidentified caller 14 to provide an utterance in the manner discussed above in connection with FIG. 1. When unidentified caller 14 responds by providing an utterance, voice messaging system 60 receives, digitizes, and records the utterance using facilities 13 and 15, respectively.

Voice messaging system 60 communicates the digitized utterance to database server 34, which together with associated DBMS 43 searches records 44 contained in database 42 to compare the digitized utterance with stored utterance identifiers corresponding to one or more known callers. If the digitized utterance suitably duplicates, resembles, matches, or is otherwise correlated with a particular utterance identifier according to one or more match parameters 46, unidentified caller 14 is identified as the known caller corresponding to the particular utterance identifier. Database server 34 retrieves appropriate information concerning the known caller from database 42, such as a name or other identifier corresponding to the known caller, and communicates this information to voice messaging system 60. Voice messaging system 60 prompts formerly unidentified caller 14 to provide a message, records the resulting message, associates the identity of formerly unidentified caller 14 with the message, and stores the associated identity and message corresponding to formerly unidentified caller 14 for subsequent communication to a user of voice messaging system 60.

When a user of voice messaging system 60 accesses voice messaging system 60, using a telephone connection, an integrated computer system, or in some other suitable manner, voice messaging system 60 provides the user with the identity of formerly unidentified caller 14 to indicate that a message corresponding to formerly unidentified caller 14 has been recorded. Voice messaging system 60 may provide the identity of formerly unidentified caller 14 to the user separately from or together with the recorded message. Where messages corresponding to multiple unidentified callers 14 have been recorded, voice messaging system 60 may provide the user with the identities of these formerly unidentified callers, in the form of a chronological list or otherwise, separately from or together with the corresponding recorded messages.

FIGS. 3a through 3c illustrate several exemplary relationships between account identifiers corresponding to one or more known callers and identity data, order data, and utterance data, respectively, for the known callers. Although in one embodiment, the tables discussed below may be related to one another using these account identifiers, the present invention contemplates using any suitable field within a record 44 to relate the record 44 to one or more other records 44 or tables of records 44 within database 42, according to relational database techniques or in some other suitable manner. An account identifier for a known caller may include, for example, an account number for an account the known caller has with the organization. The present invention contemplates a particular known caller having multiple accounts and therefore multiple account identifiers and multiple records 44 in one or more of the tables discussed below.

FIG. 3a illustrates a table 100 that contains one or more records 44 for each known caller. Each record 44 includes an account identifier 102 that corresponds to a particular known caller and is associated with identity data 104 for the known caller. For each known caller, identity data 104 may include, without limitation: a last name, first name, middle name or initial, or other suitable identifier 106; a gender 108; a street or other address 110; a city, county, state, country, or other location of residence 112; a phone number, facsimile number, network address, or other suitable communications identifier 114; an organization or firm identifier 116; a department or strategic business unit (SBU) identifier 118; a security clearance 120; and any other identity information concerning a known caller and suitable for associating with an account identifier 102 for the known caller. The present invention contemplates multiple tables 100 arranged in any suitable manner to contain one or more account identifiers 102 in association with identity data 104 for each known caller.

FIG. 3b illustrates a table 130 that contains one or more records 44 for each known caller that each include an account identifier 102 that corresponds to a particular known caller and associated order data 132 for the known caller.

Although order data 132 is discussed, the present invention contemplates one or more other tables containing records 44 for any type of information concerning the known callers, for example, banking, purchase, account, or other data concerning relationships the known callers have with the organization. Table 130 may contain multiple records 44 and order data 132 for any known caller, corresponding to multiple orders for the known caller.

Within each record 44, order data 132 may include, without limitation: a unique order identifier 134 assigned to the order by the organization or otherwise; an order date 136; a part number 138 assigned to each ordered item by the manufacturer or otherwise; a manufacturer identifier 140 for each ordered item; a serial number 142 for each ordered item; an individual, aggregate, or other purchase amount 144 for the ordered items; an order status 146; and any other information suitable for identifying, tracking, maintaining billing and inventory records for, or relating in any other suitable manner to the order that corresponds to the particular record 44.

FIG. 3c illustrates a table 160 that contains one or more records 44 for each known caller that each include an account identifier 102 that corresponds to the particular known caller and associated utterance data 162 for the known caller. For each record 44, utterance data 162 may include, without limitation: an utterance identifier 164 that includes any suitable digital or other representation of a verbal utterance provided by the particular known caller associated with the record 44; parametric encoding data 165 corresponding to the utterance or one or more characteristics of the known caller; an utterance length 166 that is measured, assessed, calculated, or otherwise determined in any suitable manner according to any suitable scale; an average or other utterance pitch 168 that is measured, assessed, calculated, or otherwise determined in any suitable manner according to any suitable scale; the name 106 for the known caller; the gender 108 for the known caller, which may be associated in some manner with the utterance pitch 168; and any other information concerning an utterance of a known caller that is suitable for comparison in some manner with corresponding information generated for an utterance provided by an unidentified caller 14.

Table 160 may contain one or more records 44 for each account identifier 102, each record 44 containing utterance data 162 that corresponds to a separately digitized and recorded utterance of the known caller associated with the account identifier 102. Furthermore, database 42 may contain multiple tables 160, each table corresponding to a specified range, minimum, maximum, or other value for one or more fields within utterance data 162, such as utterance length 166, utterance pitch 168, gender 108, or other suitable field. For example, a first table 160 might contain records 44 having utterance lengths 166 within a first range of values, a second table 160 might contain records 44 having utterance lengths 166 within a second range of values, and a third table 160 might contain records 44 having utterance lengths 166 within a third range of values. In identifying an unidentified caller 14, data communications system 10 may determine the length of the digitized utterance for unidentified caller 14 and compare the digitized utterance to one or more utterance identifiers 164 contained in the particular table 160 that corresponds to the length of the digitized utterance. Database 42 may contain as many tables 160 and types of tables 160 as are necessary or desirable.

Parametric encoding data 165 may be stored separately from or together with a corresponding utterance identifier 164. In one embodiment, parametric encoding data 165 might represent one or more fields of identity data 104, order data 132, utterance data 162, or any other information concerning the particular known caller that is suitable for association with utterance identifier 164 to identify an unidentified caller 14. For example, parametric encoding data 165 might take the form of one or more moment invariants as disclosed in U.S. Pat. No. 4,053,710 to represent the utterance for the known caller more concisely than the utterance is represented by the corresponding utterance identifier 164. A moment invariant is defined in U.S. Pat. No. 4,053,710, for a two dimensional waveform or wave pattern, as a measurement derived from the moment of the waveform, the moment being independent of the waveform position and the waveform size along the two dimensions. The moment invariants may be calculated by switching system 20 or an associated processing capability and then stored instead of, or in addition to, utterance identifier 164, which may digitally represent the utterance in its entirety.

Figure 4A:
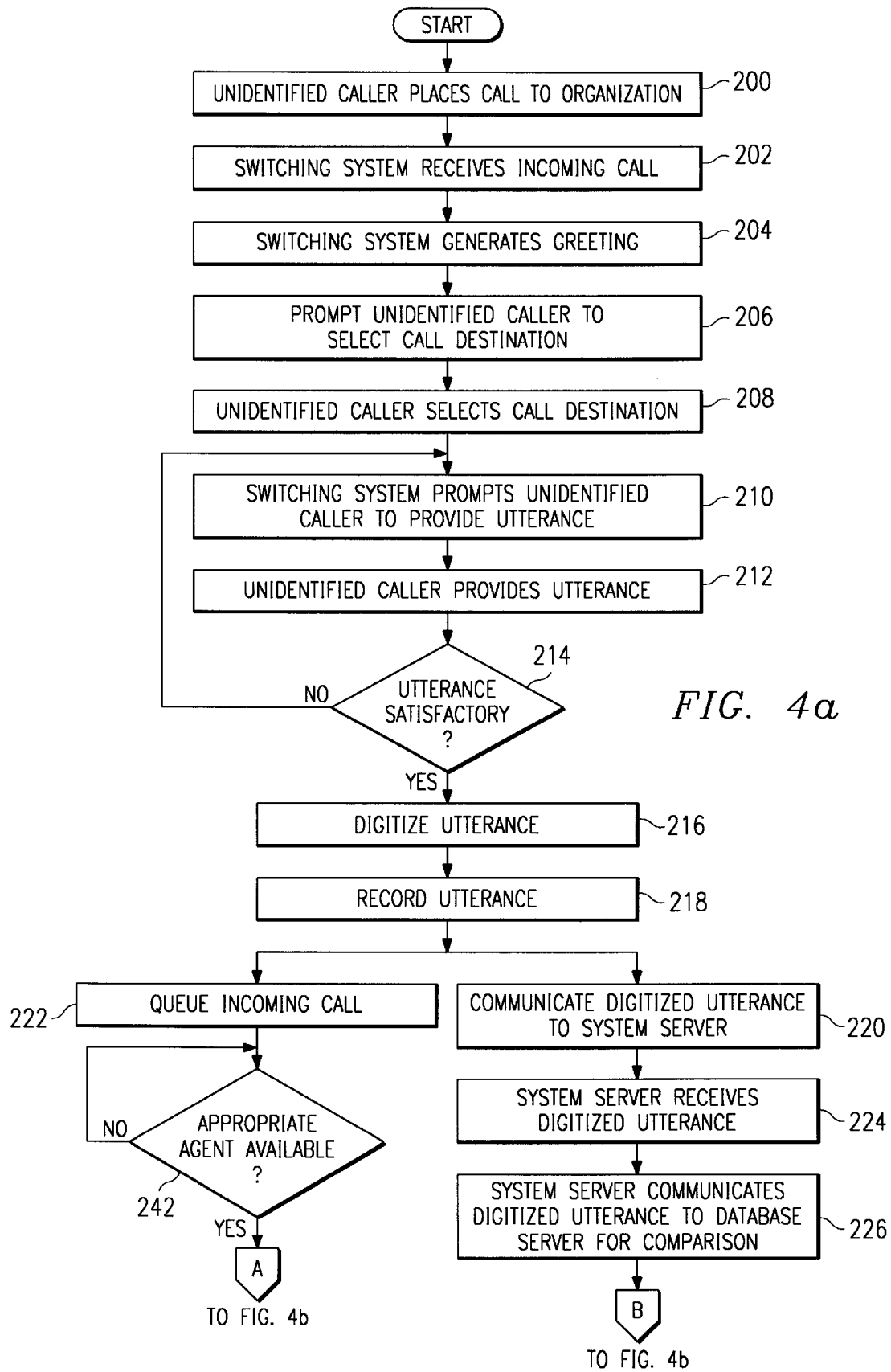
FIGS. 4a and 4b are a flow chart illustrating a method of identifying an unidentified caller.
Figure 4B:
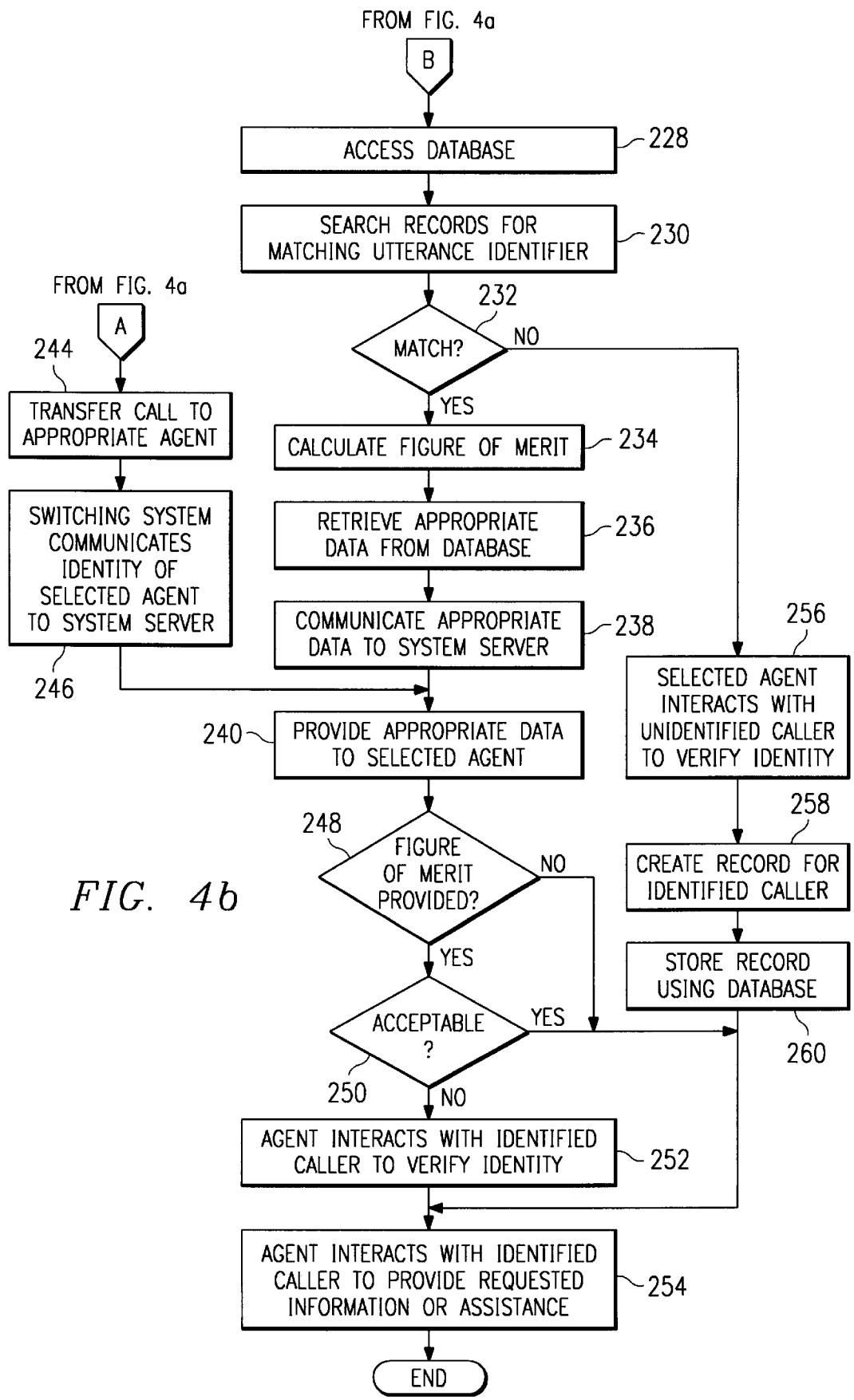

FIGS. 4a and 4b represent a flow chart of a method of identifying an unidentified caller 14. The method begins at step 200, where an unidentified caller 14 places a call to the organization using network 12 and link 22. Although system 8 may receive and process incoming calls from multiple unidentified callers 14 serially, more or less simultaneously, or in any other temporal relationship, the method is discussed herein with reference to a single unidentified caller 14. At step 202, switching system 20 receives the incoming call from unidentified caller 14 and, at step 204, generates a greeting for communication to unidentified caller 14. Switching system 20 may generate the greeting using speech generation capability 24, may play a prerecorded message to generate the greeting, or may generate the greeting in any other suitable manner.

In one embodiment, the greeting generated at step 204 prompts unidentified caller 14 to select a destination for the call at step 206. For example, and not by way of limitation, switching system 20 and associated automated attendant capability 26 may prompt unidentified caller 14 to select a call destination by playing a prerecorded message similar to the following: "Press or say '1' to be connected to our service department, press or say '2' to be connected to our order processing department, or stay on the line to speak with one of our customer service representatives." One or more agents 36 may each be associated with a particular call destination. As discussed below, switching system 20 may transfer the unidentified caller 14 to a particular agent 36 associated with the selected call destination at any appropriate time during the operation of system 8.

Either before or after unidentified caller 14 selects a call destination at step 208, switching system 20 prompts unidentified caller 14 at step 210 to provide an utterance, for example, any sound, word, or phrase, such as the name or account number of unidentified caller 14, that is suitable for comparison with one or more stored utterance identifiers 164 corresponding to one or more known callers. Switching system 20 may prompt unidentified caller 14 to provide an utterance using speech generation capability 24, by playing a prerecorded message to unidentified caller 14, such as "Whom may we say is calling?," or in any other suitable manner. At step 212, unidentified caller 14 responds by providing the requested utterance. If the utterance provided by unidentified caller 14 is inaudible, improper, or unsatisfactory at step 214, according to one or more specified parameters, the method returns to step 210, where unidentified caller 14 is again prompted to provide an utterance. If the utterance is satisfactory at step 214, switching system 20 digitizes the utterance at step 216 using analog-to-digital conversion facility 13 and records the digitized utterance at step 218 using recording facility 15.

At step 220, switching system 20 communicates the digitized utterance to system server 30 using link 32. At step 222, switching system 20 queues the incoming call pending the availability of an appropriate agent 36 to handle the incoming call, for example, a particular agent 36 associated with the call destination selected at step 208. Switching system 20 may perform steps 220 and 222 more or less in parallel, such that the branch of the method beginning at step 220 proceeds more or less in parallel with the branch of the method beginning at step 222. Referring to the branch beginning at step 220, system server 30 receives the digitized utterance corresponding to unidentified caller 14 at step 224 and, at step 226, communicates the digitized utterance to database server 34 for comparison with utterance identifiers 164 contained in database 42, tables 160, and records 44. As discussed above, database server 34 may be integral to or separate from system server 30.

At step 228, database server 34 accesses database 42 using interface 41 and communication parameters 48. At step 230, database server 34 and DBMS 43 search database 42 for one or more utterance identifiers 164 that duplicate, resemble, match, correlate with, or otherwise compare favorably to the digitized utterance corresponding to unidentified caller 14, according to one or more match parameters 46. Alternatively, database server 34 may communicate one or more match parameters 46 to DBMS 43 in association with the key or other suitable identifier to allow DBMS 43 and database 42 to locate or otherwise identify one or more utterance identifiers 164 that duplicate, resemble, match, correlate with, or otherwise compare favorably to the digitized utterance corresponding to unidentified caller 14.

In one embodiment, parametric encoding data 165 may be searched instead of, or in addition to, utterance identifiers 164 to identify unidentified caller 14. The use of parametric encoding techniques in connection with the search may speed the searching process, because the storage size for parametric encoding data 165 may be smaller than the storage size for corresponding utterance identifier 164. Furthermore, parametric encoding data 165 may be invariant with respect to factors used to identify unidentified caller 14. As a result, database server 34 and associated DBMS 43 may handle less data in searching database 42 to identify the unidentified caller 14 as a particular known caller represented in database 42.

One or more tables 160 may be searched serially, more or less simultaneously, or in any other suitable manner. One or more tables 160 may be selectively searched according to one or more characteristics of unidentified caller 14 or the utterance provided by unidentified caller 14, such as the gender of unidentified caller 14, the length of the utterance or corresponding digital representation, the average pitch of the utterance or corresponding digital representation, or other suitable characteristic. The present invention contemplates any suitable technique for comparing a digitized, parametric, or other representation of an utterance for unidentified caller 14 with utterance identifiers 164 or parametric encoding data 165, in any combination, for one or more known callers to identify unidentified caller 14 as a particular known caller.

The correlation between an utterance identifier 164 or parametric encoding data 165 and the digitized, parametric, or other representation of the utterance for unidentified caller 14 may be measured, assessed, calculated, or otherwise determined in any suitable manner. For example, parametric encoding techniques may allow database server 34 or another component of data communications system 10 to generate one or more discrimination thresholds that may be used to determine whether the digitized utterance matches an utterance identifier 164 closely enough for unidentified caller 14 to be identified as the particular known caller corresponding to the utterance identifier 164. Parametric encoding techniques may allow database server 34 or another component of data communications system 10 to calculate, arrive at, or otherwise determine a figure of merit, using one or more merit parameters contained in match parameters 46, a discrimination threshold, or other suitable factor, to indicate the certainty of an identification.

If a match is found for the digitized utterance corresponding to unidentified caller 14 at step 232, database server 34 may measure, assess, calculate, or otherwise determine a figure of merit for the match at step 234. At step 236, database server 34 and associated DBMS 43 retrieve information from database 42 corresponding to the known caller with which formerly unidentified caller 14 has been identified. The retrieved information may include some or all of the identity data 104, order data 132, or utterance data 162 for the known caller, banking, purchase, account or other data for the known caller, or any other information associated with the known caller and contained in database 42. Database server 34 communicates the retrieved information to system server 30 at step 238. At step 240, system server 30 communicates some or all of the retrieved information to an appropriate agent 36 in coordination with information received from switching system 20, as discussed below in connection with the branch is of the method beginning at step 222.

At step 222, switching system 20 queues the incoming call from unidentified caller 14 pending the availability of an appropriate agent 36 to handle the incoming call. If an appropriate agent 36 is not available at step 242, the method loops until an appropriate agent becomes available. If an appropriate agent 36 is available at step 242, for example, a selected agent 36 associated with the call destination provided by unidentified caller 14 at step 208, then switching system 20 transfers the incoming call to selected agent 36 at step 244. At step 246, switching system 20 communicates the identity, location, network address, or other suitable routing or communication information concerning selected agent 36 to system server 30. System server 30 then communicates the retrieved information to selected agent 36 in some suitable manner at step 240.

Coordinating and synchronizing the identification of selected agent 36 using switching system 20, the identification of unidentified caller 14 as a particular known caller, the retrieval of information corresponding to the known caller from database 42, and the communication, delivery, or presentation of the information to selected agent 36 may be accomplished using any suitable technique. Such techniques may include, for example, and not by way of limitation: the technique disclosed in U.S. Pat. No. 5,309,504, which is incorporated by reference herein; one or more techniques according to a TSAPI specification; one or more techniques according to a telecommunications system provider's proprietary interface; or any other suitable "screen popping" or other technique. In one embodiment, switching system 20 and system server 30 are integrated to more easily coordinate and synchronize the identification of selected agent 36, the identification of unidentified caller 14 as a particular known caller, and the communication of retrieved information concerning the known caller to the selected agent 36.

As discussed above, database server 34 or another component of data communications system 10 may calculate or otherwise determine a figure of merit to indicate the extent of the correlation or the certainty of the match between the digitized utterance for formerly unidentified caller 14 and the utterance identifier 164 for the particular known caller with which formerly unidentified caller 14 has been identified. In one embodiment, the figure of merit is communicated to selected agent 36 along with the retrieved information for the particular known caller. If either a figure of merit has not been provided at step 248, or has been provided at step 248 and is deemed acceptable by selected agent 36 at step 250, in accordance with one or more specified parameters, the method proceeds directly to step 254, where selected agent 36 interacts with formerly unidentified caller 14 in some suitable manner according to the needs of the caller or the organization. If a figure of merit has been provided at step 248, but is not deemed acceptable by selected agent 36 at step 250, selected agent 36 may interactively verify the identity of formerly unidentified caller 14 according to conventional techniques at step 252. After selected agent 36 handles the call in some suitable manner at step 254, the method ends.

If data communications system 10 is unable to match or suitably correlate the digitized utterance for unidentified caller 14 with an utterance identifier 164 corresponding to a known caller at step 232, the agent 36 selected by switching system 20 may interactively verify the identity of unidentified caller 14 according to conventional techniques at step 256. In one embodiment, the present invention is self-learning, such that if no match has been made at step 232 and unidentified caller 14 is identified interactively at step 256, system 8 may receive and store information for unidentified caller 14 for use in identifying subsequent unidentified callers 14. For example, database 42 may not contain utterance data 162 to identify unidentified caller 14 when unidentified caller 14 calls the organization, because unidentified caller 14 may have had no previous interaction with the organization. Furthermore, database 42 may not yet contain utterance data 162 for any known callers, due to the length of time system 8 has been operating or for any other reason.

At step 258, data communications system 10 may create a record 44 for formerly unidentified caller 14 containing an utterance identifier 164 and other utterance data 162 generated using the utterance provided at step 212. At step 260, the created record 44 for formerly unidentified caller 14 may be stored in one or more tables 160 within database 42. The created record 44 for formerly unidentified caller 14 may be associated with identity data 104, order data 132, or utterance data 162, banking, purchase, or account data, or other information concerning formerly unidentified caller 14, whether the information is generated before, during, or after the record 44 is created. In one embodiment, the created record 44 will correspond to a known caller for purposes of identifying subsequent unidentified callers 14 from among a universe of known callers. Before, during, or after storing the created record 44 at step 260, selected agent 36 handles the call in some suitable manner at step 254 and the method ends.

Figure 5A:
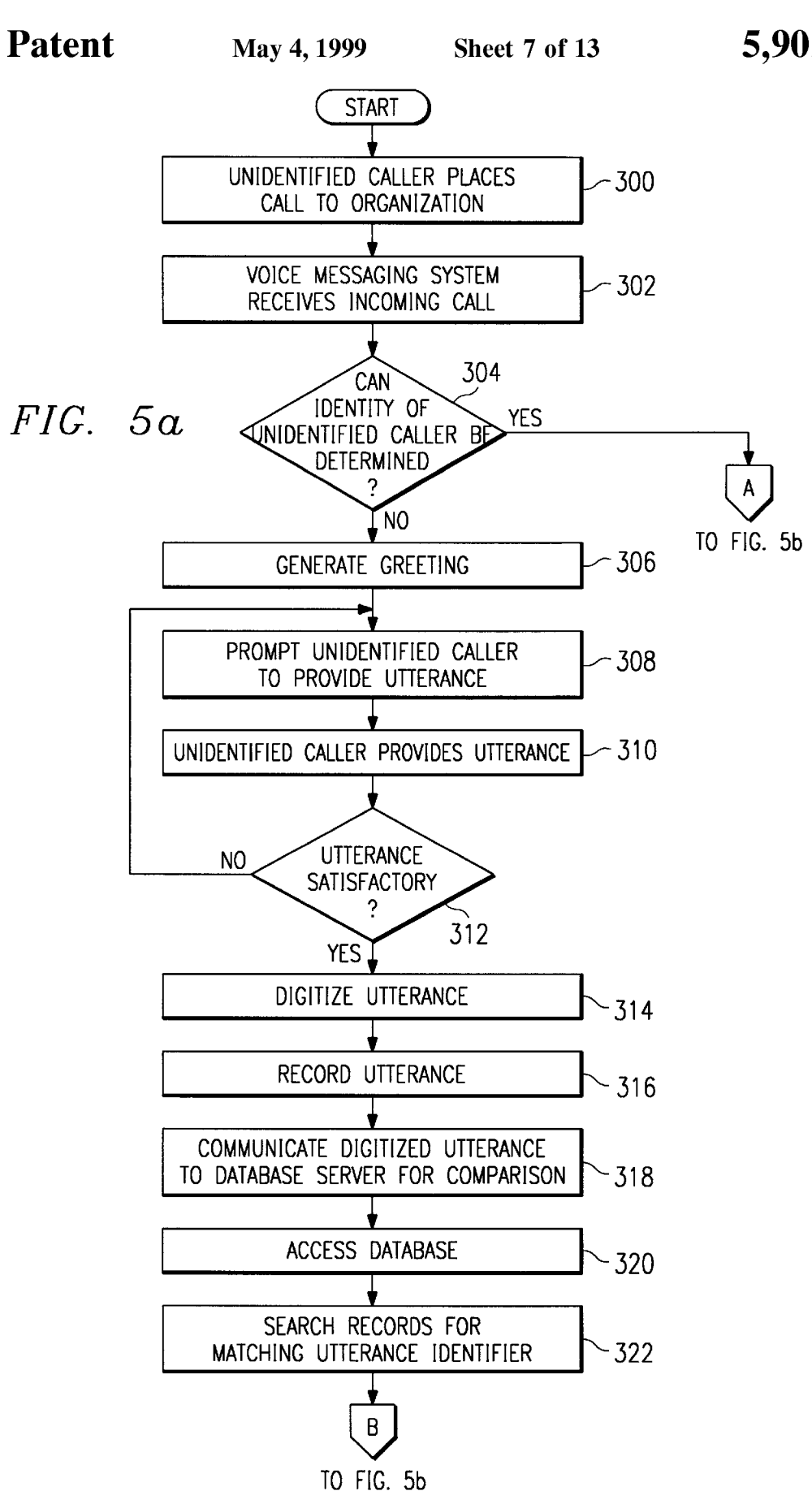
FIGS. 5a and 5b are a flow chart illustrating a method for identifying an unidentified caller in a voice messaging environment.
Figure 5B:
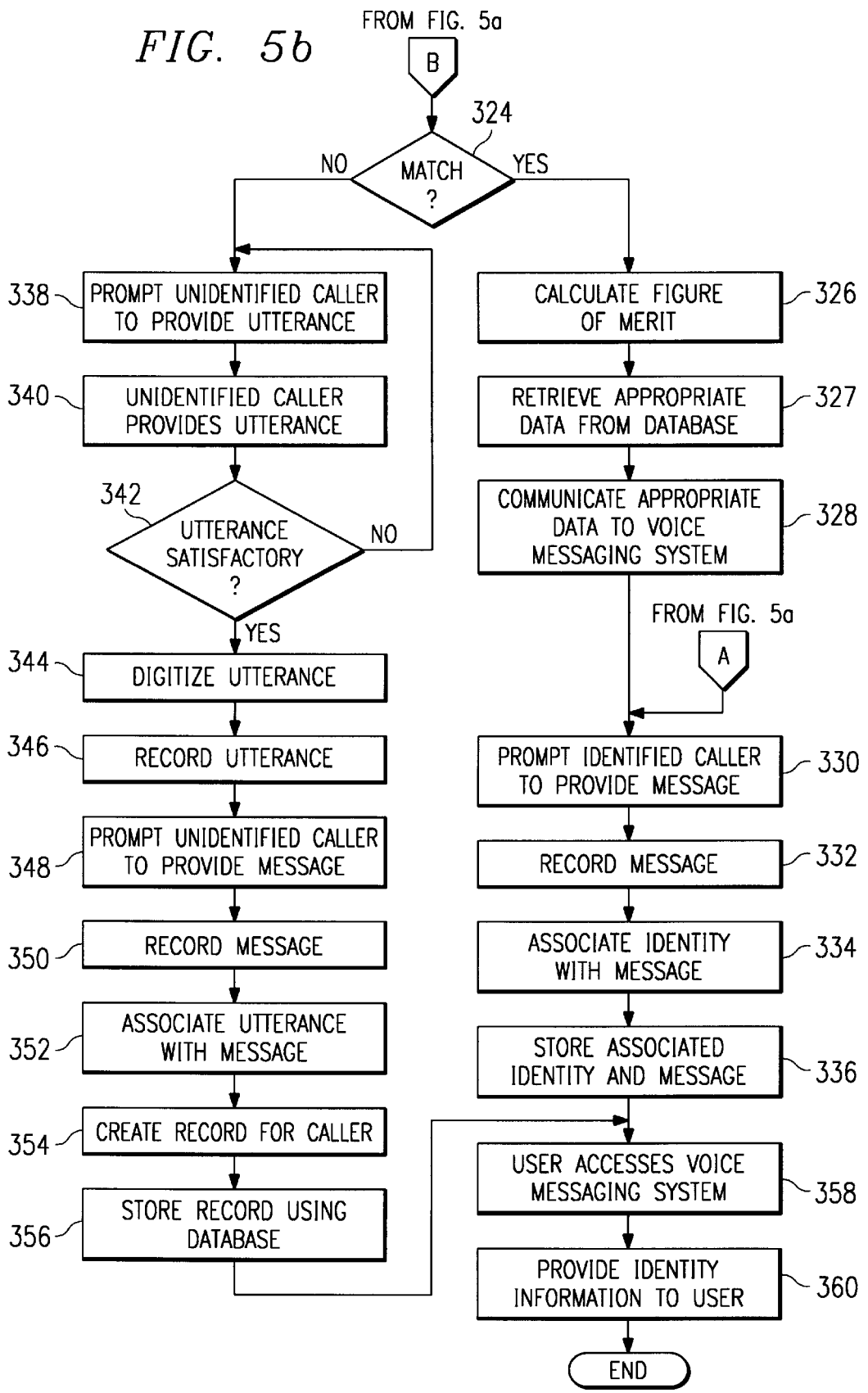

FIGS. 5a and 5b represent a flow chart of a method of identifying an unidentified caller 14 in a voice messaging environment. The method begins at step 300, where an unidentified caller 14 places a call to the organization using network 12 and link 22. Although the present invention contemplates system 9 receiving and processing incoming calls from multiple unidentified callers 14 serially, more or less simultaneously, or in any other temporal relationship, the method is discussed herein with reference to a single unidentified caller 14. Voice messaging system 60 receives the incoming call from unidentified caller 14 at step 302 and, at step 304, determines whether unidentified caller 14 can be identified using one or more conventional techniques. For example, if the incoming call originates from an extension, location, site, account, mail station, or other entity that is integral to voice messaging system 60, such as a computer terminal coupled to an organization PBX, then voice messaging system 60 may identify unidentified caller 14 using information provided by unidentified caller 14 during the sign on process.

If voice messaging system 60 identifies unidentified caller 14 at step 304, based on the origin of the incoming call or otherwise, then the method proceeds to step 330, where voice messaging system 60 prompts unidentified caller 14 to provide a message for subsequent communication to a user of voice messaging system 60. If voice messaging system 60 does not identify unidentified caller 14 at step 304, for whatever reason, then voice messaging system 60 generates a greeting for communication to unidentified caller 14 at step 306 in the manner discussed above in connection with FIGS. 4a and 4b. In one embodiment, the greeting prompts unidentified caller 14 at step 308 to provide an utterance, for example, any sound, word, or phrase, such as a name or other identifier corresponding to unidentified caller 14, that is suitable for comparison with one or more utterance identifiers 164 corresponding to one or more known callers and stored using database 42 and tables 160.

At step 310, unidentified caller 14 responds by providing the requested utterance. If the utterance is inaudible, improper, or otherwise unsatisfactory at step 312, according to one or more specified parameters, the method returns to step 308, where unidentified caller 14 is again prompted to provide an utterance. If the provided utterance is satisfactory at step 312, voice messaging system 60 digitizes the utterance at step 314 using analog-to-digital conversion facility 13 and records the utterance at step 316 using recording facility 15. Voice messaging system 60 communicates the digitized utterance to database server 34 at step 318 using link 32.

At step 320, database server 34 accesses database 42 using interface 41 and communication parameters 48. At step 322, database server 34 and associated DBMS 43 search database 42 for one or more utterance identifiers 164 that duplicate, resemble, match, correlate with, or otherwise compare favorably to the digitized utterance corresponding to unidentified caller 14, according to one or more match parameters 46. As discussed above with reference to FIGS. 4a and 4b, parametric encoding data 165 may be searched instead of, or in addition to, utterance identifiers 164 to identify unidentified caller 14 from among a universe of known callers. If the digitized utterance corresponding to unidentified caller 14 matches an utterance identifier 164 at step 324, database server 34 may measure, assess, calculate, or otherwise determine a figure of merit for the identification of formerly unidentified caller 14 at step 326 in the manner discussed above.

At step 327, database server 34 and associated DBMS 43 retrieve information from database 42 corresponding to the known caller with which formerly unidentified caller 14 has been identified. The retrieved information may include some or all of the identity data 104 for the known caller, such as a name or other identifier 106 for the known caller, or any other information associated with the particular known caller and contained in database 42. Database server 34 communicates the retrieved information to voice messaging system 60 at step 328. In one embodiment, the figure of merit determined at step 326 is communicated to voice messaging system 60 together with or separately from the retrieved information.

At step 330, voice messaging system 60 prompts formerly unidentified caller 14 to provide a message for subsequent communication to a user of voice messaging system 60. Voice messaging system 60 records any resulting message at step 332, associates the identity of formerly unidentified caller 14 with the recorded message at step 334, and stores the associated identity and recorded message corresponding to formerly unidentified caller 14 at step 336. Voice messaging system 60 may prompt the caller to provide and may record a message before, during, or after the caller provides an utterance for identification purposes. When a user of voice messaging system 60 accesses voice messaging system 60 at step 358, using a telephone connection, an integrated computer system, or in some other suitable manner, voice messaging system 60 may communicate the identity of formerly unidentified caller 14 to the user to indicate that formerly unidentified caller 14 recorded a message using voice messaging system 60.

The present invention contemplates associating the identity of formerly unidentified caller 14 with the recorded message corresponding to formerly unidentified caller 14 before, during, or after the user accesses voice messaging system 60. Voice messaging system 60 may provide the identity of formerly unidentified caller 14 separately from or together with the recorded message corresponding to formerly unidentified caller 14. If multiple unidentified callers 14 have interacted with voice messaging system 60 to provide messages for a user, voice messaging system 60 may provide the user with the identities of the formerly unidentified callers 14 at step 360, in a chronological list or other suitable format, separately from or together with the recorded messages corresponding to the formerly unidentified callers 14.

Voice messaging system 60 may provide the identities and any other information retrieved from database 42 for one or more formerly unidentified callers 14 to the user in any appropriate manner. For example, if voice messaging system 60 is integral to, associated with, or suitably connected to a computer or other processing device such as computer 50, then voice messaging system 60 may provide some or all of the retrieved information using output device 54 or another device suitable for conveying visual information. Alternatively, if voice messaging system 60 is accessed using a telephone only connection, for example, by the user entering a voice mail box number, PBX extension, or other identifier, voice messaging system 60 may audibly convey the retrieved information, in whole or in part. The present invention contemplates any suitable combination of such techniques to provide the identities of one or more formerly unidentified callers 14 for which messages have been recorded to a user of voice messaging system 60.

Voice messaging system 60 may provide the identities of one or more formerly unidentified callers 14, in a chronological list format or otherwise, together with other retrieved or other information concerning formerly unidentified callers 14, the recorded messages corresponding to formerly unidentified callers 14, or any combination of the above. For example, for a recorded message corresponding to formerly unidentified caller 14, voice messaging system 60 might provide, in any suitable relative arrangement, without limitation: the identity of formerly unidentified caller 14; the figure of merit associated with the identification of formerly unidentified caller 14; the total number of recorded messages corresponding to formerly unidentified caller 14; the length of the message; the time, day, and/or date the message was recorded; and any other suitable information concerning formerly unidentified caller 14 or the particular recorded message. Once the user accesses voice messaging system 60 and receives the identities of formerly unidentified callers 14 and any other appropriate information at step 360, the method ends.

In one embodiment, system 9 is self-learning, such that if no match is made at step 324 between the utterance provided by unidentified caller 14 and an utterance identifier 164 corresponding to a known caller, system 9 creates a record 44 for the unidentified caller 14 that may be used to identify a subsequent unidentified caller 14 as the unidentified caller 14 corresponding to the created record 44. For example, database 42 may not contain utterance data 162 suitable to identify unidentified caller 14, because unidentified caller 14 may have had no previous interaction with the organization or voice messaging system 60. Moreover, database 42 may not yet contain utterance data 162 for any known callers, due to the length of time system 9 has been operating or for some other reason. If the identity of unidentified caller 14 is verified in some suitable manner after the created record 44 is generated, the created record 44 for unidentified caller 14 may be used as a record 44 that corresponds to a known caller to identify one or more subsequent unidentified callers 14 in the manner discussed above.

If voice messaging system 60 cannot or does not match or suitably correlate the digitized utterance for unidentified caller 14 with an utterance identifier 164 corresponding to a known caller at step 324, for whatever reason, voice messaging system 60 may prompt unidentified caller 14 to provide an utterance at step 338 in the manner discussed above with reference to step 308. The present invention contemplates voice messaging system 60 using the utterance provided at step 308 instead of, or in addition to, prompting unidentified caller 14 for an utterance at step 338. Unidentified caller 14 provides the requested utterance at step 340 and, if the utterance is satisfactory at step 342, voice messaging system 60 digitizes and records the utterance at steps 344 and 346, respectively. In one embodiment, voice messaging system 60 may also translate the utterance into a format understandable to system 9 using the associated speech recognition capability 23. If the provided utterance is not satisfactory at step 342, the method returns to step 338, where unidentified caller 14 is again prompted to provide an utterance.

Before or after unidentified caller 14 is prompted to provide an utterance at step 338, voice messaging system 60 prompts unidentified caller 14 to provide a message at step 348 for subsequent communication to a user of voice messaging system 60. Voice messaging system 60 records any resulting message at step 350 and associates the utterance, the translated utterance, or both the utterance and translated utterance for unidentified caller 14 with the recorded message at step 352. In conjunction with database server 42 and associated DBMS 43, voice messaging system 60 creates a record 44 for unidentified caller 14 at step 354 and, at step 356, stores the created record 44 in one or more tables 160 within database 42. In one embodiment, the created record 44 for unidentified caller 14 contains an utterance identifier 164 that digitally represents the utterance provided by unidentified caller 14. One or more created records 44 may also contain other utterance data 162 corresponding to the utterance and any other suitable information, whether or not associated with utterance identifier 164.

In one embodiment, the recorded utterance or the translation of the utterance for unidentified caller 14 is used to indicate to a user of voice messaging system 60 that a message corresponding to unidentified caller 14 has been recorded. The created record 44 for unidentified caller 14 is used to identify a subsequent unidentified caller 14 as the particular unidentified caller 14 for which the created record 44 was generated.

When a user of voice messaging system 60 accesses voice messaging system 60 at step 358, voice messaging system 60 may communicate the utterance, the translated utterance, and any other suitable information concerning unidentified caller 14 to the user at step 360 using any of the techniques discussed above. For example, if voice messaging system 60 is integral to, associated with, or suitably connected to a computer or other processing device such as computer 50, then voice messaging system 60 may provide a translation of the utterance, generated using speech recognition capability 23, to the user using output device 54 or another device suitable for conveying visual information. Alternatively, if voice messaging system 60 is accessed using a telephone only connection, for example, by the user entering a voice mail box number, PBX extension, or other identifier, voice messaging system 60 may aurally convey the utterance to the user.

Voice messaging system 60 may provide utterances or translated utterances for one or more unidentified callers 14, in a chronological list format or otherwise, together with or separately from: any other suitable information concerning unidentified callers 14; the recorded messages corresponding to unidentified callers 14; the identities of formerly unidentified callers 14; any other information concerning formerly unidentified callers 14; the recorded messages corresponding to formerly unidentified callers 14; or any combination of the above. After system 9 has provided this information to the user at step 360, the method ends.

Figure 6:
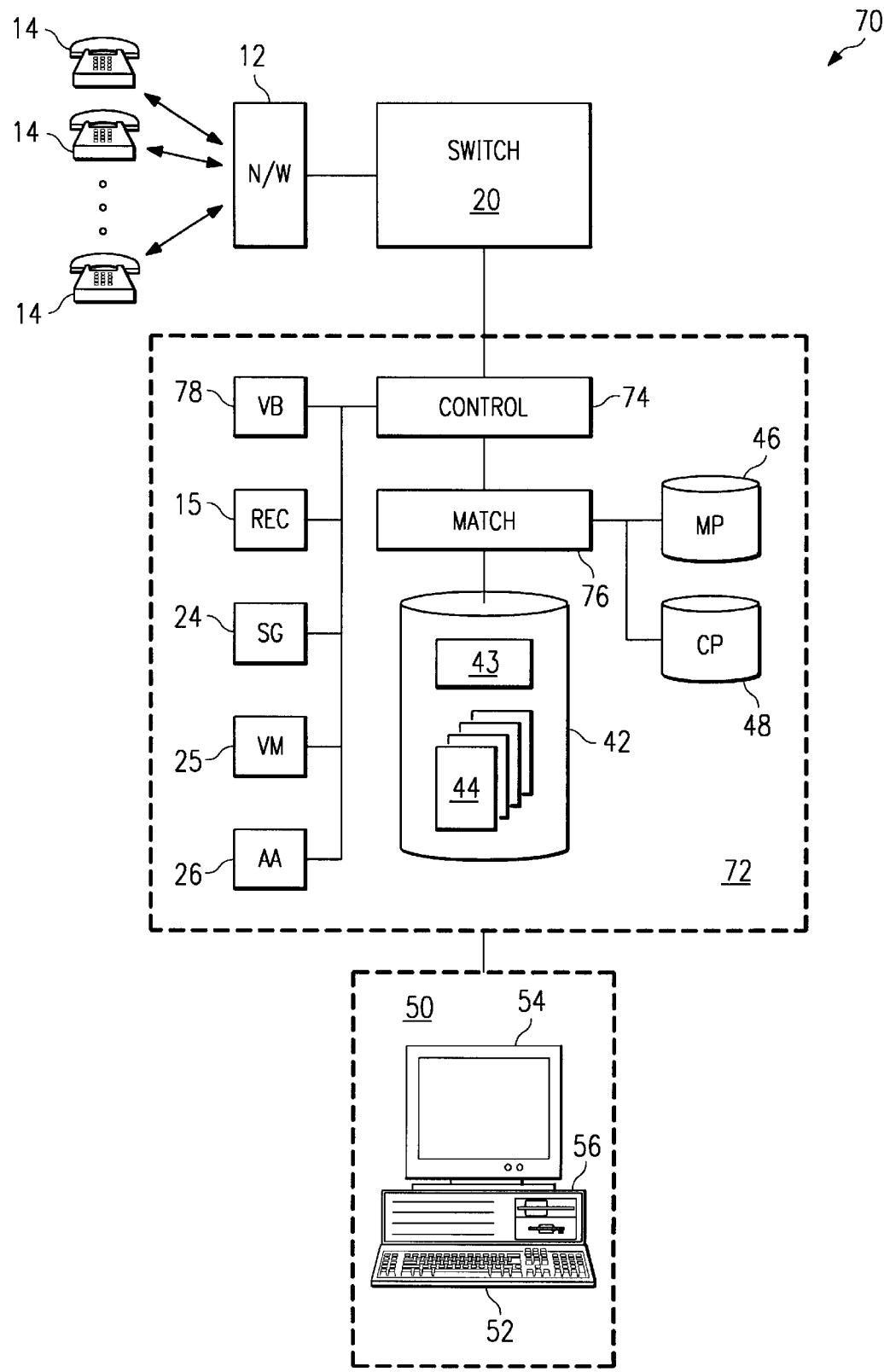
FIG. 6 illustrates a computer-based system for identifying an unidentified caller.

FIG. 6 illustrates an exemplary computer-based system 70 for identifying an unidentified caller 14 that includes network 12, switching system 20, and processing system 72. Processing system 72 may include, without limitation: a control module (CONTROL) 74; a match module (MATCH) 76; a voice board 78; recording facility 15; speech generation capability 24; voice messaging capability 25; automated attendant capability 26; match parameters 46; communications parameters 48; database 42; and any other suitable components. In one embodiment, processing system 72 operates on a called party's personal or other computer 50 in a home setting, business or other organizational setting, or any other suitable environment to provide some or all of the functionality discussed above with reference to FIG. 1. The present invention contemplates: some or all of switching system 20 being integral to computer 50; processing system 72 distributed to operate on multiple computers 50 or telephone units at one or more locations; components of processing system 72, such as database 42, being integral to or separate from processing system 72; or processing system 72, computer 50, switching system 20, or any combination of the above being integral to a called party's telephone unit. Those skilled in the art will appreciate that other suitable arrangements may be devised without departing from the intended scope of the present invention.

Voice board 78 includes appropriate circuitry for detecting ringing signals or other call origination signals and for performing analog-to-digital or digital-to-analog conversion, as the case may be. Voice board 78 is of a type well known in the art and may be in the form of a computer-oriented modem, in the form of a specialized voice board of the type manufactured by DIALOGIC CORPORATION or RHETORIX CORPORATION and used for computer telephony integration (CTI), or in any other suitable form. Voice board 78 may replace or combine with analog-to-digital conversion facility 13 shown in FIG. 1. Analog-to-digital conversion may alternatively be performed using capabilities associated with switching system 20. Match module (MATCH) 76 performs functionality discussed above with reference to FIG. 1 for identifying unidentified callers 14 by comparing utterance information for unidentified callers 14 with stored utterance data 162 for known callers. Control module (CONTROL) 74 coordinates communications between various components of processing system 72 according to the operation of processing system 72 and system 70. Using the capabilities discussed above, system 70 identifies one or more unidentified callers 14 and, in response, provides one or more call routing options to a called party. The present invention contemplates processing system 72 routing calls in a pre-programmed manner according to the identification of some or all unidentified callers 14.

Figure 7A:
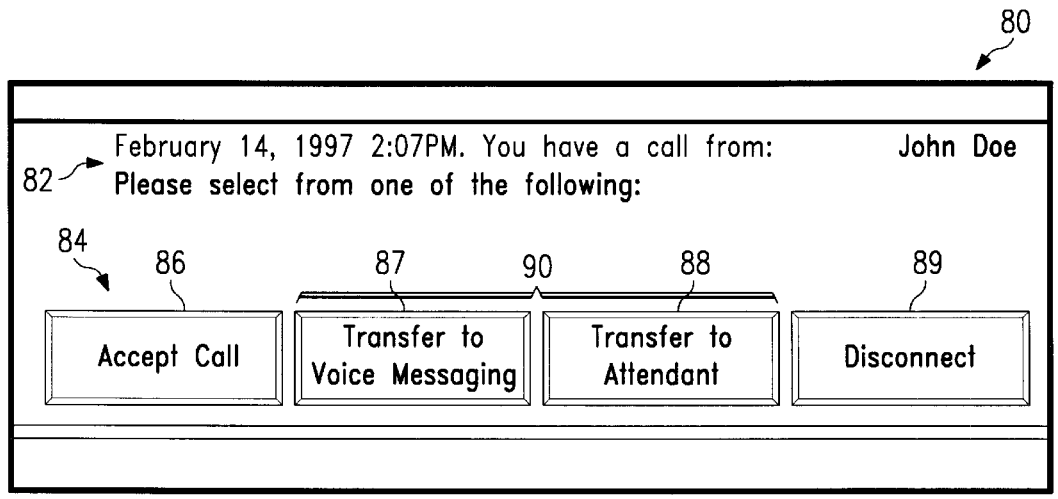
FIGS. 7a through 7d illustrate exemplary option screens.

FIGS. 7a through 7d illustrate option screens that processing system 72 may present to the called party using output device 56 of computer 50, a liquid crystal display (LCD) or light emitting diode (LED) display associated with a telephone unit, or in any other suitable manner according to the operation of processing system 72 and activities of the called party. FIG. 7a illustrates first option screen 80 that is presented to the called party in response to processing system 72 receiving an incoming call from unidentified caller 14, receiving an utterance from unidentified caller 14, and identifying unidentified caller 14 as a particular known caller. First option screen 80 includes textual information 82 that may include the date and time, the identity of formerly unidentified caller 14, an instructional or other message, and any other suitable information, in any combination. First option screen 80 also includes call routing options 84, which are presented to the called party in the form of window buttons, as shown in FIG. 7a, as numbered options, or in any other appropriate form. The present invention contemplates some or all of the information associated with first option screen 80 being presented to the called party audibly in addition to or instead of visually.

In one embodiment, call routing options 84 include: (1) an accept option 86 that the called party selects to accept the call from formerly unidentified caller 14; (2) a voice messaging option 87 that the called party selects to transfer the call or otherwise leave a message to voice messaging capability 25; (3) an attendant option 88 that the called party selects to transfer the call to a secretary or other assistant or to automated attendant capability 26, as the case may be; (4) a disconnect option 89 that the called party selects to disconnect the call; and (5) any other call routing options 84. Voice messaging capability 25 may be a message recording facility either collocated with or remote from the called party and the associated computer 50 or telephone unit. Collectively, voice messaging option 87 and attendant option 88 may be referred to as transfer option 90. The functionality associated with attendant option 88 may be separated among multiple transfer options 90. The called party may select from among call routing options 84 using a mouse or other suitable pointer to select an appropriate window button on output device 56, using a keyboard such as input device 52 of computer 50 to enter an appropriate number or letters, or using any other suitable technique for indicating a selection. Processing system 72 may route calls from one or more formerly unidentified callers 14 according to pre-programmed routing information in response to identifying unidentified callers 14 as known callers.

Figure 7B:
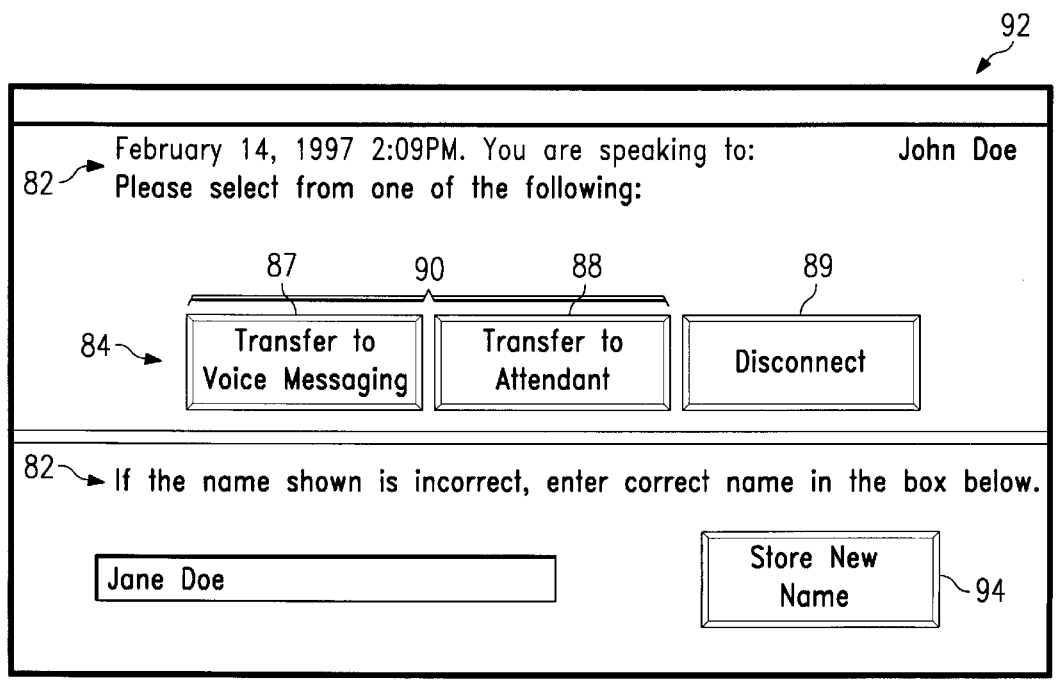

FIG. 7b illustrates second option screen 92 that is presented to the called party in response to the called party selecting accept option 86 associated with first option screen 80. Similar to first option screen 80, second option screen 92 includes textual information 82 and suitable call routing options 84, which may include voice messaging option 87, attendant option 88, disconnect option 89, and any other appropriate call routing options 84. As a result, the called party maintains real-time control over the call even after accepting the call, which provides an important technical advantage of the present invention. As discussed above, the called party may select from among call routing options 84 using a mouse or other suitable pointer to select an appropriate window button on output device 56, using a keyboard such as input device 52 of computer 50 to enter an appropriate number or letters, or using any other suitable technique.

In one embodiment, second option screen 92 includes textual information 82 that instructs the called party to provide a corrected identity if the formerly unidentified caller 14 was identified incorrectly, because the formerly unidentified caller 14 provided an utterance sufficiently different from one or more previous utterances for formerly unidentified caller 14 or for any other reason. For example, and not be way of limitation, unidentified caller 14 may have a changed name, a medical or other condition, or a relatively poor transmission facility. After the called party types, speaks, or otherwise enters or provides a corrected identity, assuming one is necessary, the called party may cause processing system 72 to store the corrected identity of formerly unidentified caller 14 with utterance information that processing system 72 used to incorrectly identify the formerly unidentified caller 14 in database 42, as name 106 and corresponding utterance identifier 164. The called party may use a store window button 94 on output device 56, keys on input device 52, or any other suitable technique to store the corrected identity and utterance information.

Figure 7C:
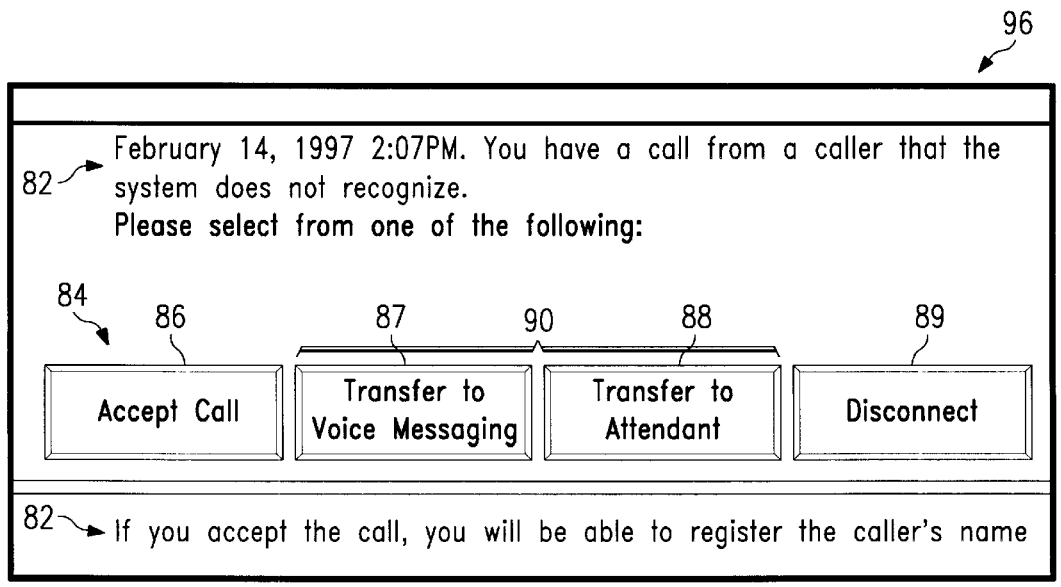

FIG. 7c illustrates third option screen 98 presented to the called party in response to processing system 72 receiving an incoming call from unidentified caller 14, receiving an utterance from unidentified caller 14, and being unable to adequately identify unidentified caller 14. Similar to first option screen 80, third option screen 96 includes textual information 82 and suitable call routing options 84, which may include accept option 86, voice messaging option 87, attendant option 88, disconnect option 89, and any other appropriate call routing options 84. In one embodiment, textual information 82 may explain to the called party that the called party may register the identity of unidentified caller 14 after selecting accept option 86 and identifying unidentified caller 14 through personal interaction, as discussed more fully below.

Figure 7D:
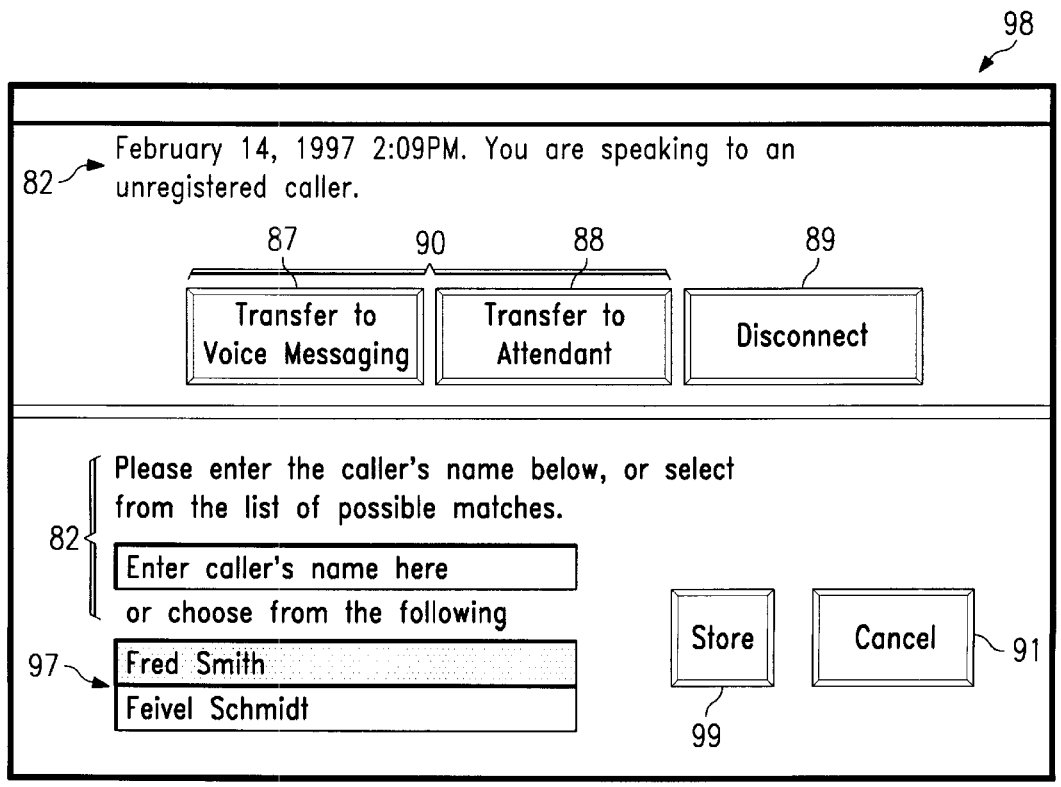

FIG. 7d illustrates fourth option screen 98 that is presented to the called party in response to the called party selecting accept option 86 associated with third option screen 96. Similar to second option screen 92, fourth option screen 98 includes textual information 82 and appropriate call routing options 84, which may include voice messaging option 87, attendant option 88, disconnect option 89, and any other appropriate call routing options 84. As discussed above, the called party maintains real-time control over the call even after accepting the call, providing an important technical advantage of the present invention. In one embodiment, fourth option screen 98 includes textual information 82 that instructs the called party to provide the identity of unidentified caller 14 for registering unidentified caller 14 with processing system 72. Textual information 82 may also invite the called party to select a name from a list 97 of known callers who might possibly be unidentified caller 14, based upon the similarity of the utterance information for unidentified caller 14 to stored utterance identifiers 164 for the known callers, but for whom no match could be made to within the predetermined accuracy threshold.

After the called party provides the identity of unidentified caller 14 or selects the identity of a known caller from list 97, the called party may cause processing system 72 to store the identity as a new name 106 in table 160 with the utterance information for unidentified caller 14 or, if a known caller is selected from list 97, to store the utterance information as an utterance identifier 164 associated with name 106 for the known caller. The called party may register the formerly unidentified caller 14 using a store window button 99 on output device 56, keys of input device 52, or any other suitable technique. The called party may also select a cancel window button 91 or otherwise indicate that the called party does not wish to register formerly unidentified caller 14 with processing system 72. As the above discussion indicates, the present invention may be self-learning to increase the likelihood that processing system 72 will correctly identify the formerly unidentified caller 14 the next time the formerly unidentified caller 14 calls.

Figure 8A:
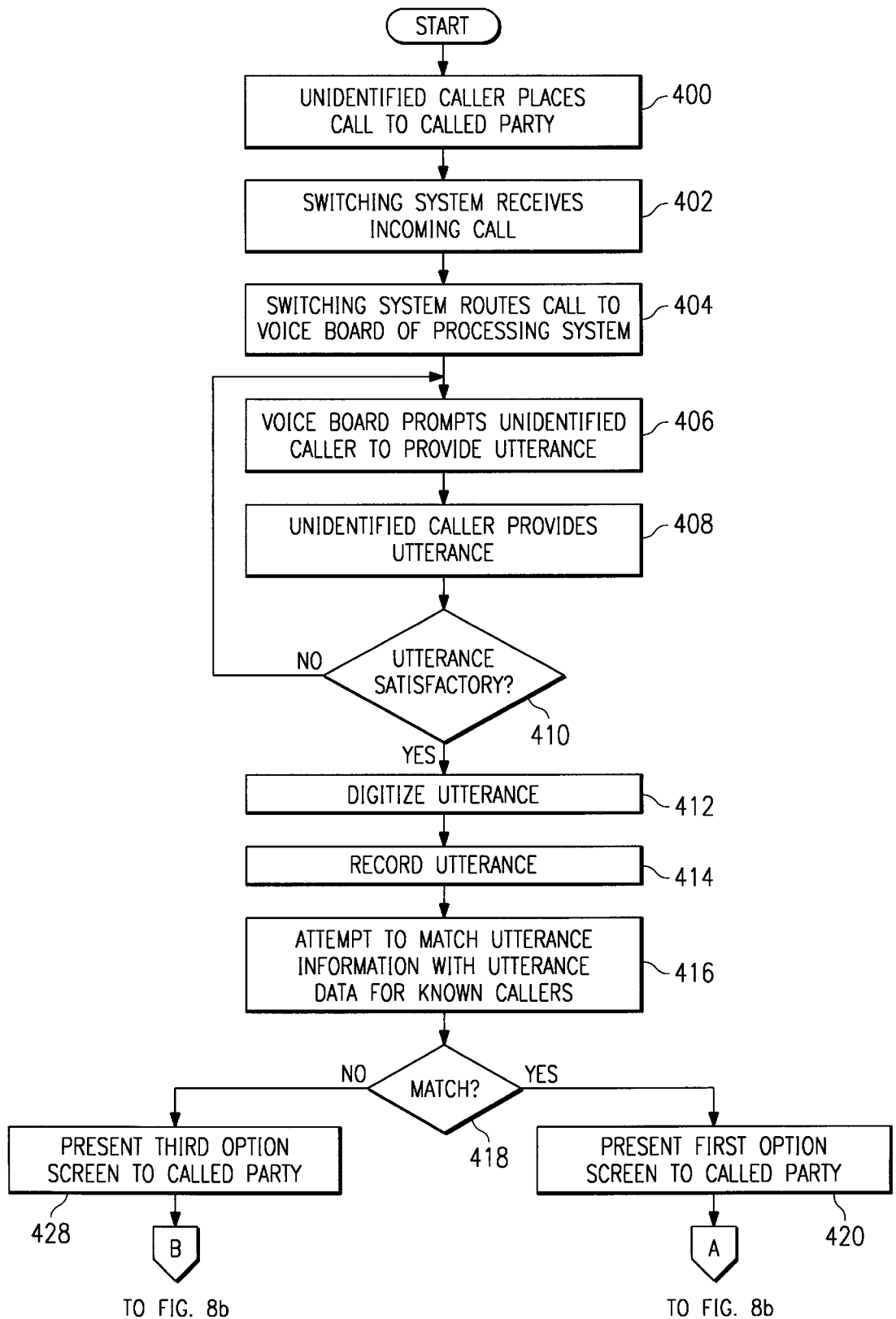

FIGS. 8a and 8b are a flow chart illustrating an exemplary method of identifying an unidentified caller 14. The method begins at step 400, where unidentified caller 14 places a call to the called party, who may be in a home, business or organizational, or any other suitable setting, using network 12 and link 22. Although system 70 may receive and process calls from one or more unidentified callers 14 serially, more or less simultaneously, or in any other temporal relationship, the method is discussed with reference to a single unidentified caller 14. At step 402, switching system 20 receives the incoming call and, at step 404, routes the call to voice board 78 of processing system 72. Voice board 78 audibly prompts unidentified caller 14 to provide an utterance at step 406 and, at step 408, unidentified caller 14 provides the requested utterance. As discussed above, the utterance may be any sound, word, or phrase, such as the name of unidentified caller 14, suitable for being digitized and compared with previously stored utterance identifiers 164 corresponding to one or more known callers.

If the utterance provided by unidentified caller 14 at step 408 is inaudible, improper, or unsatisfactory at step 410, according to one or more specified parameters, the method returns to step 406, where voice board 78 again prompts unidentified caller 14 to provide an utterance. If the utterance is satisfactory at step 410, voice board 78 digitizes the utterance at step 412 and processing system 72 records the digitized utterance for unidentified caller 14 at step 414 using recording facility 15. At step 416, match module 76 of processing system 72 attempts to match the digitized utterance for unidentified caller 14 with an utterance identifier 164 contained in database 42 in the manner discussed more fully above. If a match is found for the digitized utterance at step 418, processing system 72 presents first option screen 80 and the associated call routing options 84 to the called party at step 420, using output device 56 of computer 50, an LCD or LED display associated with the called party's telephone unit, audibly using a speaker or "head set" associated with computer 50, or in any other appropriate manner.

If the called party accepts the call at step 422, for example, by selecting accept option 86 using a mouse or other pointer, keys on input device 52 of computer 50, or in any other suitable manner, processing system 72 connects the called party to formerly unidentified caller 14 at step 424. Processing system 72 may connect unidentified caller 14 to the called party, for example, by coupling the phone line to a microphone and speakers associated with computer 50 or the called party's telephone unit, to a "head set" associated with computer 50 or the called party's telephone unit, or using any other appropriate technique. At step 426, processing system 72 presents the called party with second option screen 92, which may be presented as an entirely new screen on output device 56 or as a modified version of first option screen 80.

If the called party does not accept the call at step 422, and instead selects another call routing option 84 for the call, processing system 72 transfers or disconnects the call at step 432 according to the call routing option 84 selected, and the method ends. For example, if voice messaging option 87 is selected, formerly unidentified caller 14 is transferred to voice messaging capability 25 through a "switch hook transfer," telecommunications API (TAPI), TSAPI, or ISDN commands, or any other appropriate mechanism. If voice messaging system 25 is integral to computer 50, transfer may be unnecessary and processing system 72 may invoke voice messaging capability 25 more or less directly. Alternatively, if the called party selects attendant option 88, formerly unidentified caller 14 is routed to an assistant, to automated attendant capability 26, or to any other suitable predetermined destination. As discussed above, this transfer may be performed according to a "switch hook transfer" or standard commands. Another alternative for the called party is to select disconnect option 89 to disconnect the call. The present invention contemplates other call routing options 84 as alternatives to accept option 86. Processing system 72 may also route calls from some or all unidentified callers 14 according to pre-programmed call routing information in response to the identification of unidentified callers 14.

If formerly unidentified caller 14 has been identified in error at step 434, for whatever reason, the called party may provide a corrected identity at step 436 and store the corrected identity with the utterance information for the formerly unidentified caller 14 at step 438, using store window button 94 or any other suitable technique, as name 106 and corresponding utterance identifier 164 in database 42. Since the called party maintains real-time control over the call even after accepting the call, the called party may select a transfer option 90 or disconnect option 89 at step 440 according to particular needs, in which case the method proceeds to step 432. Alternatively, the call may proceed at step 442 until terminated in some manner at step 444, for example, when the call reaches its natural conclusion and the called party hangs up, in which case the method ends. Steps 440 through 444 are repeated more or less continually until the called party transfers the call, disconnects the call, or the call is terminated in some other manner. If formerly unidentified caller 14 was not identified in error at step 434, the method proceeds to step 440 directly. Steps 434 through 444 may occur in any relative sequence according to the operation of processing system 72 and the actions of the called party.

If processing system 72 is unable to find a match at step 418, processing system 72 presents third option screen 96 and the associated call routing options 84 to the called party using output device 56 or in any other suitable manner at step 428. If the called party selects a transfer option 90 or disconnect option 89 rather than selecting accept option 86 at step 430, then processing system 72 transfers or disconnects the call at step 432 according to the selected call routing option 84, and the method ends. If the called party selects accept option 86 at step 430, processing system 72 presents the called party with fourth option screen 98 at step 446. If fourth option screen 98 includes a list 97 of one or more known callers for which utterance identifiers 164 possibly match the utterance information for the formerly unidentified caller 14 at step 448, and one of the known callers is in fact the formerly unidentified caller 14, the called party may select the identity of a particular known caller at step 450. At step 452, the called party may store the utterance information for the formerly unidentified caller 14 with name 106 for the corresponding known caller in database 42, and the method proceeds to step 440, where the called party may exercise real-time control over the call by selecting a call routing option 84.

If fourth option screen 98 does not include a list 97 of one or more known callers for which stored utterance identifiers 164 possibly match the utterance information for formerly unidentified caller 14, or if no known caller in list 97 is in fact the formerly unidentified caller 14, the called party may register formerly unidentified caller 14 with processing system 72 at step 454. The called party may type, speak, or otherwise enter the identity of the formerly unidentified caller 14 at step 456 and, at step 458, may store the utterance information for the formerly unidentified caller 14 with the identity of the formerly unidentified caller 14 in database 42 as name 106 and corresponding utterance identifier 164. The method then proceeds to step 440, where the called party may exercise real-time control over the call. If the called party does not elect to register the formerly unidentified caller 14 with processing system 72 at step 454, the method proceeds directly to step 440.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A computer-based system for identifying a caller that performs the identification independent of human interaction with the caller, comprising:

a database containing stored speech data identified with a known caller;

a switching system associated with the destination telephone number and receiving an incoming call and speech information from the caller, the caller having input a destination telephone number;

a control module coupled to the switching system and receiving the incoming call from the switching system, the control module further receiving the speech information from the switching system in response to the incoming call; and a match module coupled to the control module and the database, the match module receiving speech data for the caller from the control module in response to the incoming call and independent of human interaction with the caller, the match module comparing the speech data for the caller with the stored speech data independent of human interaction with the caller to identify the caller, the system storing additional speech data identified with the known caller using the speech data for the caller, the control module providing a call routing option, in response to identification of the caller, for routing the incoming call.

2. The system of claim 1, wherein the database contains speech data corresponding to a plurality of known callers.

3. The system of claim 1, wherein the call routing option is selected from the group consisting of:
  an accept option;
  a transfer option; and
  a disconnect option.

4. The system of claim 1, wherein the control module routes the incoming call according to a selected call routing option.

5. The system of claim 1, wherein the control module is further operable to receive a corrected identity for the caller in response to incorrectly identifying the caller as a particular known caller.

6. The system of claim 5, wherein the system is further operable to store the corrected identity for the caller in association with the speech data for the caller.

7. The system of claim 1, wherein the control module is further operable to provide the call routing option in response to selection of an accept option, wherein the call routing option is selected from the group consisting of:
  a transfer option; and
  a disconnect option.

8. The system of claim 1, wherein the control module is further operable to receive the identity of the caller if the caller is not identified independent of human interaction with the caller, the system being further operable to store the identity of the caller in association with the speech data for the caller.

9. A computer-based system for identifying a caller that performs the identification independent of human interaction with the caller, comprising:
  a database that is integral to a computer and contains speech data identified with a known caller;
  a switching system associated with a destination telephone number and receiving an incoming call and speech information from the caller, the caller having input the destination telephone number;
  a control module integral to the computer and coupled to the switching system, the control module receiving the incoming call from the switching system and receiving the speech information from the switching system in response to the incoming call;
  a match module, integral to the computer, coupled to the control module and to the database, the match module receiving speech data for the caller from the control module in response to the incoming call and independent of human interaction with the caller, the match module comparing the speech data for the caller with the stored speech data independent of human interaction with the caller to identify the caller, the control module providing a call routing option, in response to identification of the caller, for routing the incoming call; and an output device coupled to the computer and operable to visually display the call routing option.

10. The system of claim 9, wherein the call routing option is selected from the group consisting of:
  an accept option;
  a transfer option; and
  a disconnect option.

11. A method for identifying an unidentified caller, the identification being performed independent of human interaction with the caller, the method comprising:
  storing speech data identified with a known caller;
  receiving an incoming call from the caller, the caller having input a destination telephone number;
  receiving speech information from the caller in response to the incoming call;
  communicating speech data for the caller to a match module independent of human interaction with the unidentified caller;
  comparing the speech data for the caller with the stored speech data independent of human interaction with the caller and using the match module;
  identifying the caller according to the comparison;
  storing additional speech data identified with the known caller using the speech data for the caller; and
  providing a call routing option, in response to identifying the caller, for routing the incoming call.

12. The method of claim 11, wherein the speech data for the known caller is stored in a database containing speech data corresponding to a plurality of known callers.

13. The method of claim 11, wherein the call routing option is selected from the group consisting of:
  an accept option;
  a transfer option; and
  a disconnect option.

14. The method of claim 11, further comprising the steps of:
  receiving a call routing option selection; and
  routing the incoming call according to the selection.

15. The method of claim 11, further comprising the step of receiving a corrected identity for the caller in response to incorrectly identifying the caller as a particular known caller.

16. The method of claim 15, further comprising the step of storing the corrected identity in association with the speech data for the caller.

17. The method of claim 11, further comprising the step of:
  receiving an accept option selection; and
  wherein the step of providing the call routing option comprises providing the call routing option in response to receiving the selection, wherein the call routing option is selected from the group consisting of:
  a transfer option; and
  a disconnect option.

18. The method of claim 11, further comprising the steps of:
  receiving the identity of the caller if the caller is not identified independent of human interaction with the caller; and
  storing the identity of the caller in association with the speech data for the caller.

19. The method of claim 11, further comprising the step of comparing speech data for a second caller with the stored speech data and additional speech data, independent of human interaction with the second caller and using the match module, to identify the second caller.

20. The method of claim 11, wherein the step of providing the call routing option comprises providing the call routing option to a called party associated with the destination telephone number visually using a computer.

21. The system of claim 1, wherein the match module compares speech data for a second caller with the stored speech data and with the additional stored speech data to identify the second caller.

22. The system of claim 9, wherein the system stores additional speech data using the speech data for the caller and the match module compares speech data for a second caller with the stored speech data and with the additional stored speech data to identify the second caller.

23. A computer-based system for identifying a caller and operable to perform the identification independent of human interaction with the caller, comprising:

a database containing stored speech data identified with a plurality of known callers;

a switching system associated with the destination telephone number and receiving an incoming call and speech information from the caller, the caller having input a destination telephone number;

a control module coupled to the switching system and receiving the incoming call from the switching system, the control module further receiving the speech information from the switching system in response to the incoming call; and a match module coupled to the control module and the database, the match module receiving speech data for the caller from the control module in response to the incoming call and independent of human interaction with the caller, the match module comparing the speech data for the caller with at least some of the stored speech data independent of human interaction with the caller to attempt to identify the caller, the match module determining more than one of the plurality of known callers as possibly being the caller if the match module is unable to identify the caller as a particular known caller, the control module providing the called party with the identities of the more than one known callers.

24. A method for identifying an unidentified caller, the identification being attempted independent of human interaction with the caller, the method comprising:

storing speech data identified with a plurality of known callers;

receiving an incoming call from the caller, the caller having input a destination telephone number;

receiving speech information from the caller in response to the incoming call;

communicating speech data for the caller to a match module independent of human interaction with the unidentified caller;

comparing the speech data for the caller with at least some of the stored speech data independent of human interaction with the caller and using the match module;

determining more than one of the plurality of known callers as possibly being the caller if identification of the caller as a particular known caller is unsuccessful; and providing the called party with the identities of the more than one known callers.

* * * * *